United States Patent
Shah et al.

(10) Patent No.: US 11,544,714 B2
(45) Date of Patent: Jan. 3, 2023

(54) APPARATUS, COMPUTER PROGRAM AND METHOD OF TRACING EVENTS IN A COMMUNICATIONS NETWORK

(71) Applicant: VOCALINK LIMITED, London (GB)

(72) Inventors: Syed Asim Ali Shah, Harrow (GB); David William Divitt, London (GB)

(73) Assignee: VOCALINK LIMITED, London (GB)

( * ) Notice: Subject to any disclaimer, the term of this patent is extended or adjusted under 35 U.S.C. 154(b) by 0 days.

(21) Appl. No.: 17/307,777

(22) Filed: May 4, 2021

(65) Prior Publication Data
US 2021/0350378 A1 Nov. 11, 2021

(30) Foreign Application Priority Data
May 7, 2020 (EP) ..................................... 20173405

(51) Int. Cl.
*G06Q 20/40* (2012.01)
(52) U.S. Cl.
CPC ....... *G06Q 20/4016* (2013.01); *G06Q 20/405* (2013.01); *G06Q 20/4014* (2013.01)
(58) Field of Classification Search
CPC ........... G06Q 20/4016; G06Q 20/4014; G06Q 20/405
See application file for complete search history.

(56) References Cited

U.S. PATENT DOCUMENTS

| | | | | |
|---|---|---|---|---|
| 11,023,896 B2* | 6/2021 | Zhou | ................ | G06Q 20/4016 |
| 2012/0284175 A1* | 11/2012 | Wilson | ................ | G06Q 20/223 705/39 |
| 2013/0091058 A1* | 4/2013 | Huster | ................ | G06Q 20/327 705/44 |
| 2017/0124569 A1* | 5/2017 | Revelle | ................ | G06Q 20/401 |
| 2019/0220863 A1* | 7/2019 | Novick | ................ | G06Q 20/10 |
| 2020/0020002 A1* | 1/2020 | Ceribelli | ................ | G06Q 20/102 |
| 2020/0106688 A1* | 4/2020 | Dewar | ................ | G06Q 20/389 |

(Continued)

FOREIGN PATENT DOCUMENTS

| | | | | |
|---|---|---|---|---|
| GB | 2559775 | * | 2/2017 | ............. G06Q 20/40 |
| GB | 2559775 A | * | 8/2018 | ............. G06Q 20/10 |

OTHER PUBLICATIONS

European Patent Office, "Extended European search report, EP application No. 20173105.0-1213", dated Oct. 29, 2020, 7 pages.

*Primary Examiner* — Bruce I Ebersman
*Assistant Examiner* — Matthew Cobb
(74) *Attorney, Agent, or Firm* — Pillsbury Winthrop Shaw Pittman LLP

(57) ABSTRACT

An apparatus for storing a set of events, is provided, the apparatus comprising one or more circuitry configured to: receive an electronic message comprising information of a first event between a first party and a second party, the first event being initiated by the first party; determine whether a record of the first event exists in a first storage unit; wherein when it is determined that the record of the first event does not exist, the one or more circuitry is configured to: determine whether any subsequent events between the second party and a third party are initiated by the second party within a predetermined time of the first event; and store an association between the second party and a first set of events, the first set of events comprising the first event and the subsequent event, in a second storage unit, when the subsequent event is initiated within the predetermined time.

18 Claims, 21 Drawing Sheets

(56) References Cited

U.S. PATENT DOCUMENTS

2020/0106689 A1    4/2020  Dewar
2020/0272959 A1*  8/2020  Mattsson ............... G06Q 20/22
2020/0311728 A1*  10/2020  Jain ..................... G06Q 20/401

* cited by examiner

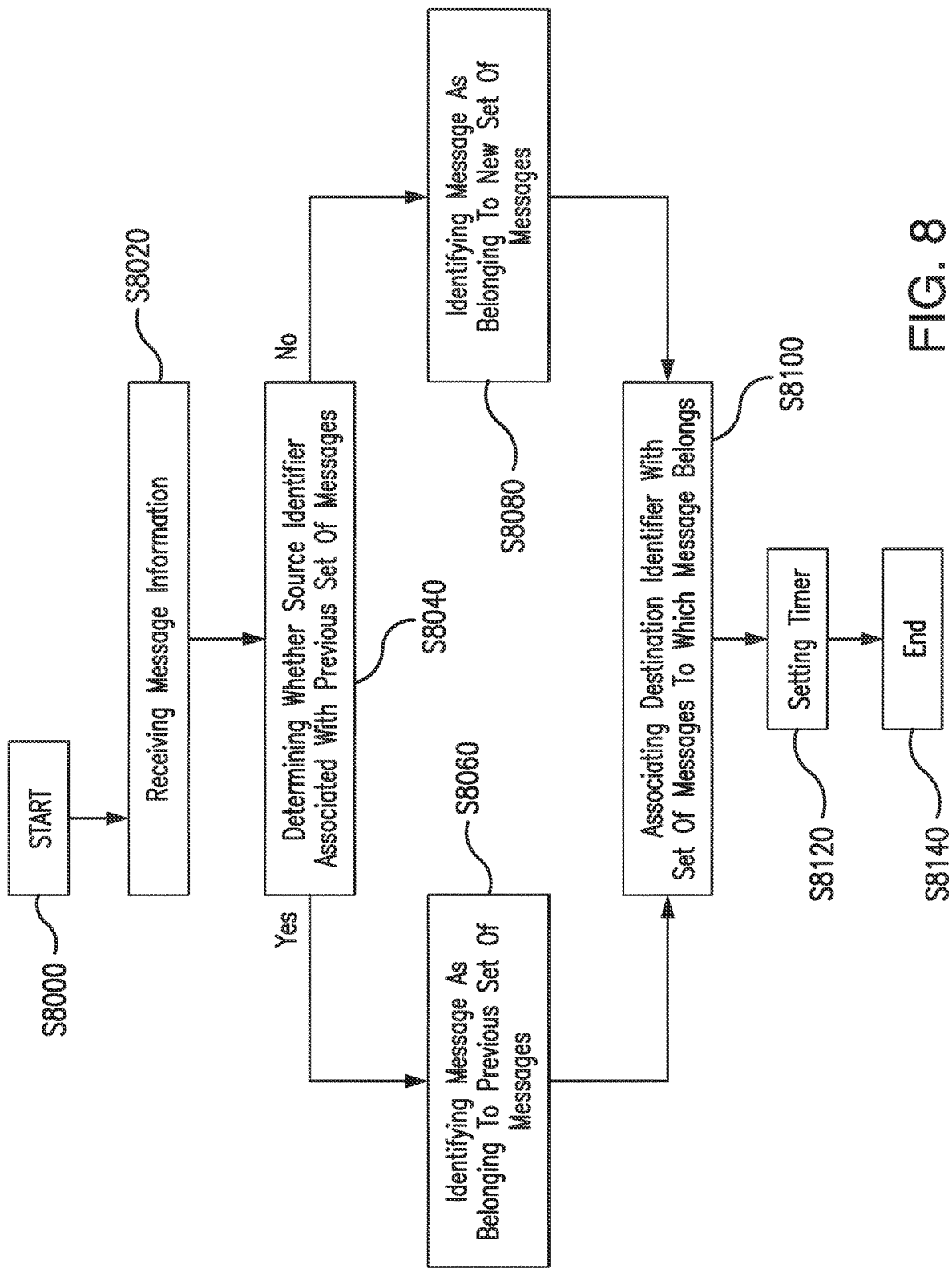

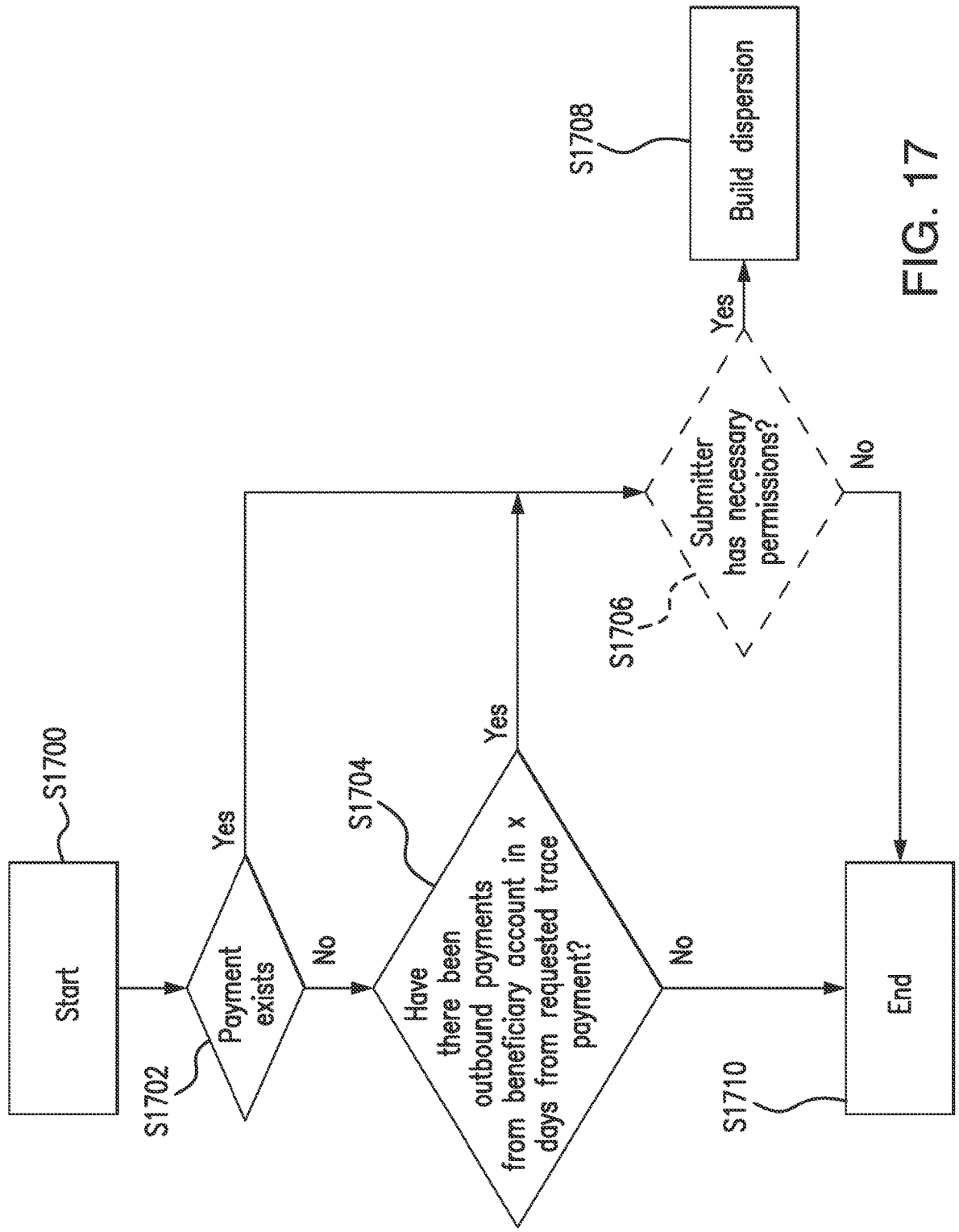

APPARATUS, COMPUTER PROGRAM AND METHOD OF TRACING EVENTS IN A COMMUNICATIONS NETWORK

RELATED APPLICATIONS

This application claims priority to European Patent Application No. 20173405.0, filed May 7, 2020, which is incorporated herein by reference in its entirety.

FIELD OF THE DISCLOSURE

The present technique relates to an apparatus, computer program and method.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In modern communication networks, an increasingly large volume of electronic messages are being exchanged in an ever shorter period of time. These messages are often exchanged between disparate entities in a communications network.

Now, in certain situations, it is desirable to trace the exchange of electronic messages across a communication network. That is, there are situations where it is desirable that the distribution and dispersion of messages across the communication network can be efficiently determined. From such distribution and dispersion, the connections between disparate entities in a communications network can be rapidly identified. In fact, in some situations, it may be desirable to trace and track any form of electronic interaction which occurs between the entities in a communication network.

It will be appreciated that it is particularly challenging to trace and track electronic interactions which occur between entities when those entities are located in different communication networks. That is, different communication networks have different technical capabilities and, as such, it can be challenging to trace the interactions which occur between entities when a number of those entities are located across different communication networks. In this situation, each individual network is controlled by a network controller which oversees and controls the communication between the entities of that network. However, the network controller for a first network cannot oversee or control the communication between entities in a second network. Accordingly, when an interaction occurs between an entity in the first network and an entity in the second network, it can be difficult to trace the interaction between those entities, as there is no single network controller which oversees the interaction between those entities. Rather, each network controller sees, at best, only a single part of the interaction.

Likewise, it is particularly challenging to trace and track electronic interactions between entities when those entities engage in a number of different types of electronic interactions. Accordingly, in a large communication network where a number of different types of interactions occur between the component entities, it is difficult to construct and store a uniform view of the connections between the entities in the network.

SUMMARY

According to an aspect of the disclosure, a method of storing a set of events is provided, the method comprising: receiving, by a first circuitry, an electronic message comprising information of a first event between a first party and a second party, the first event being initiated by the first party; determining, by a second circuitry, whether a record of the first event exists in a first storage unit; wherein when it is determined that the record of the first event does not exist, the method comprises: determining, by the second circuitry, whether any subsequent events between the second party and a third party are initiated by the second party within a predetermined time of the first event; and storing, by the second circuitry, an association between the second party and a first set of events, the first set of events comprising the first event and the subsequent event, in a second storage unit, when the subsequent event is initiated within the predetermined time.

According to an aspect of the disclosure, an apparatus for storing a set of events is provided, the apparatus comprising one or more circuitry configured to: receive an electronic message comprising information of a first event between a first party and a second party, the first event being initiated by the first party; determine whether a record of the first event exists in a first storage unit; wherein when it is determined that the record of the first event does not exist, the one or more circuitry is configured to: determine whether any subsequent events between the second party and a third party are initiated by the second party within a predetermined time of the first event; and store an association between the second party and a first set of events, the first set of events comprising the first event and the subsequent event, in a second storage unit, when the subsequent event is initiated within the predetermined time.

According to an aspect of the disclosure, a computer program product comprising instructions which, when executed by a computer, cause the computer to carry out a method of storing a set of events is provided, the method comprising: receiving, by a first circuitry, an electronic message comprising information of a first event between a first party and a second party, the first event being initiated by the first party; determining, by a second circuitry, whether a record of the first event exists in a first storage unit; wherein when it is determined that the record of the first event does not exist, the method comprises: determining, by the second circuitry, whether any subsequent events between the second party and a third party are initiated by the second party within a predetermined time of the first event; and storing, by the second circuitry, an association between the second party and a first set of events, the first set of events comprising the first event and the subsequent event, in a second storage unit, when the subsequent event is initiated within the predetermined time.

According to aspects of the present disclosure, efficient and rapid tracking of electronic interactions between entities located across different networks can be performed, in a substantially real time environment.

The foregoing paragraphs have been provided by way of general introduction, and are not intended to limit the scope of the following claims. The described examples, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 illustrates a method of building a set of traceable messages through a network of nodes according to an embodiment of the disclosure;

FIG. 17 illustrates an example method which may be performed by an apparatus in accordance with examples of the disclosure;

DESCRIPTION OF THE EMBODIMENTS

Figure 1:
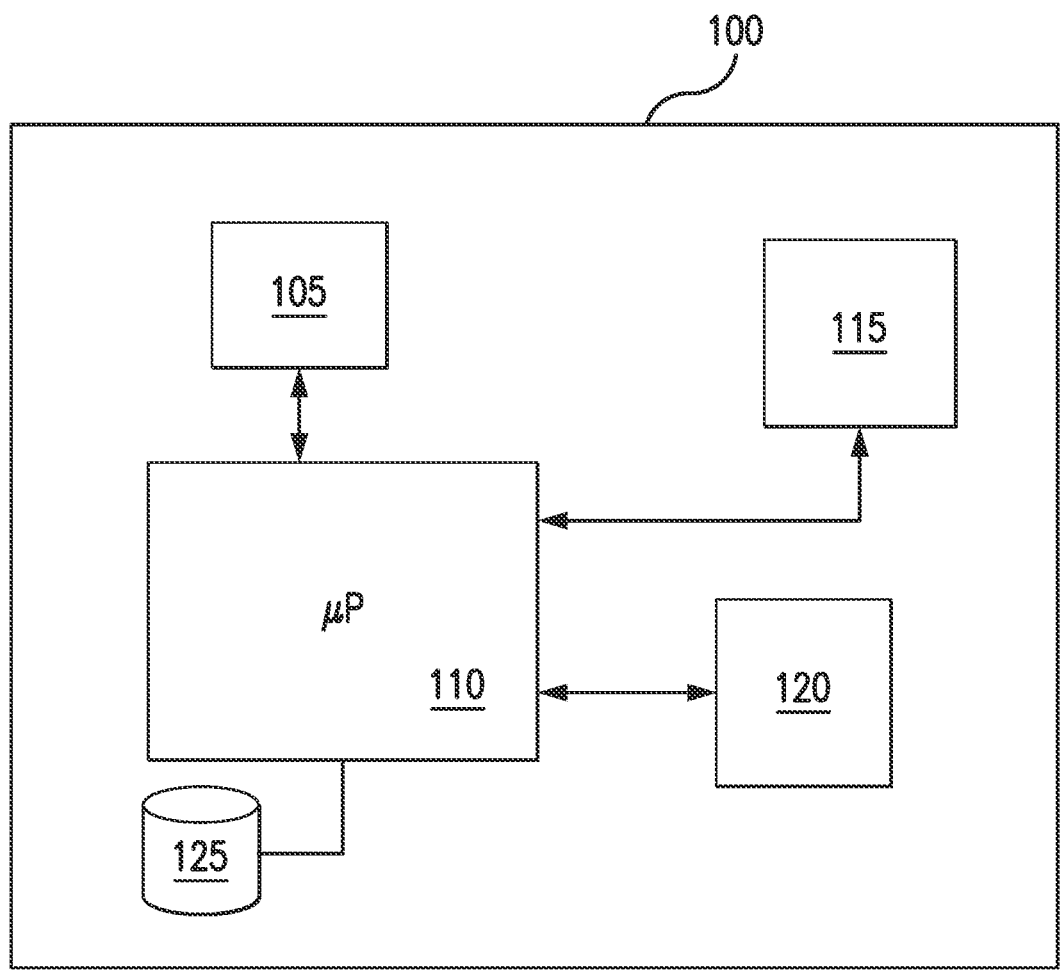
FIG. 1 shows an apparatus according to examples of the present disclosure.

Referring now to the drawings, wherein like reference numerals designate identical or corresponding parts throughout the several views.

Referring to FIG. 1, an apparatus 100 according to examples of the disclosure is shown. Typically, an apparatus 100 according to examples of the disclosure is a computer device such as a personal computer or a terminal connected to a server. Indeed, in examples, the apparatus may also be a server. The apparatus 100 is controlled using a microprocessor or other processing circuitry 110.

The processor circuitry 110 may be a microprocessor carrying out computer instructions or may be an Application Specific Integrated Circuit. The computer instructions are stored on storage medium 125 which may be a magnetically readable medium, optically readable medium or solid state type circuitry. The storage medium 125 may be integrated into the apparatus 100 or may be separate to the apparatus 100 and connected thereto using either a wired or wireless connection. The computer instructions may be embodied as computer software that contains computer readable code which, when loaded onto the processor circuitry 110, configures the processor circuitry 110 to perform a method according to examples of the disclosure.

Additionally connected to the processor circuitry 110, is a user input 105. The user input 105 may be a touch screen or may be a mouse or stylist type input device. The user input 105 may also be a keyboard or any combination of these devices.

A network connection 115 is also coupled to the processor circuitry 110. The network connection 115 may be a connection to a Local Area Network or a Wide Area Network such as the Internet or a Virtual Private Network or the like. The network connection 115 may be connected to banking infrastructure allowing the processor circuitry 110 to communicate with other banking institutions to obtain relevant data or provide relevant data to the institutions. The network connection 115 may therefore be behind a firewall or some other form of network security.

Additionally coupled to the processor circuitry 110, is a display device 120. The display device, although shown integrated into the apparatus 100, may additionally be separate to the apparatus 100 and may be a monitor or some kind of device allowing the user to visualise the operation of the system. In addition, the display device 120 may be a printer or some other device allowing relevant information generated by the apparatus 100 to be viewed by the user or by a third party.

Figure 2A:
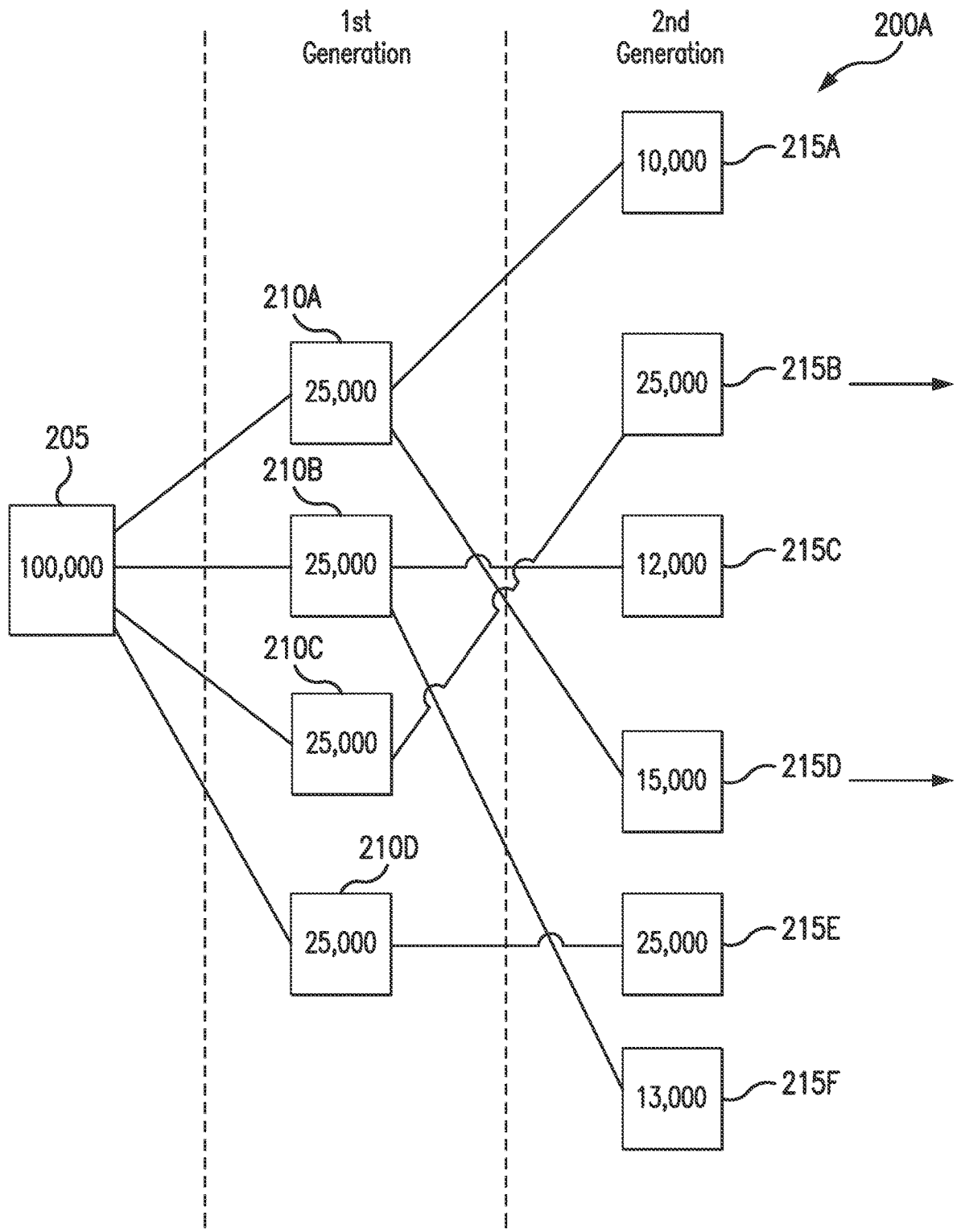
FIGS. 2A and 2B show a schematic diagram of a fraudulent transaction.
Figure 2B:
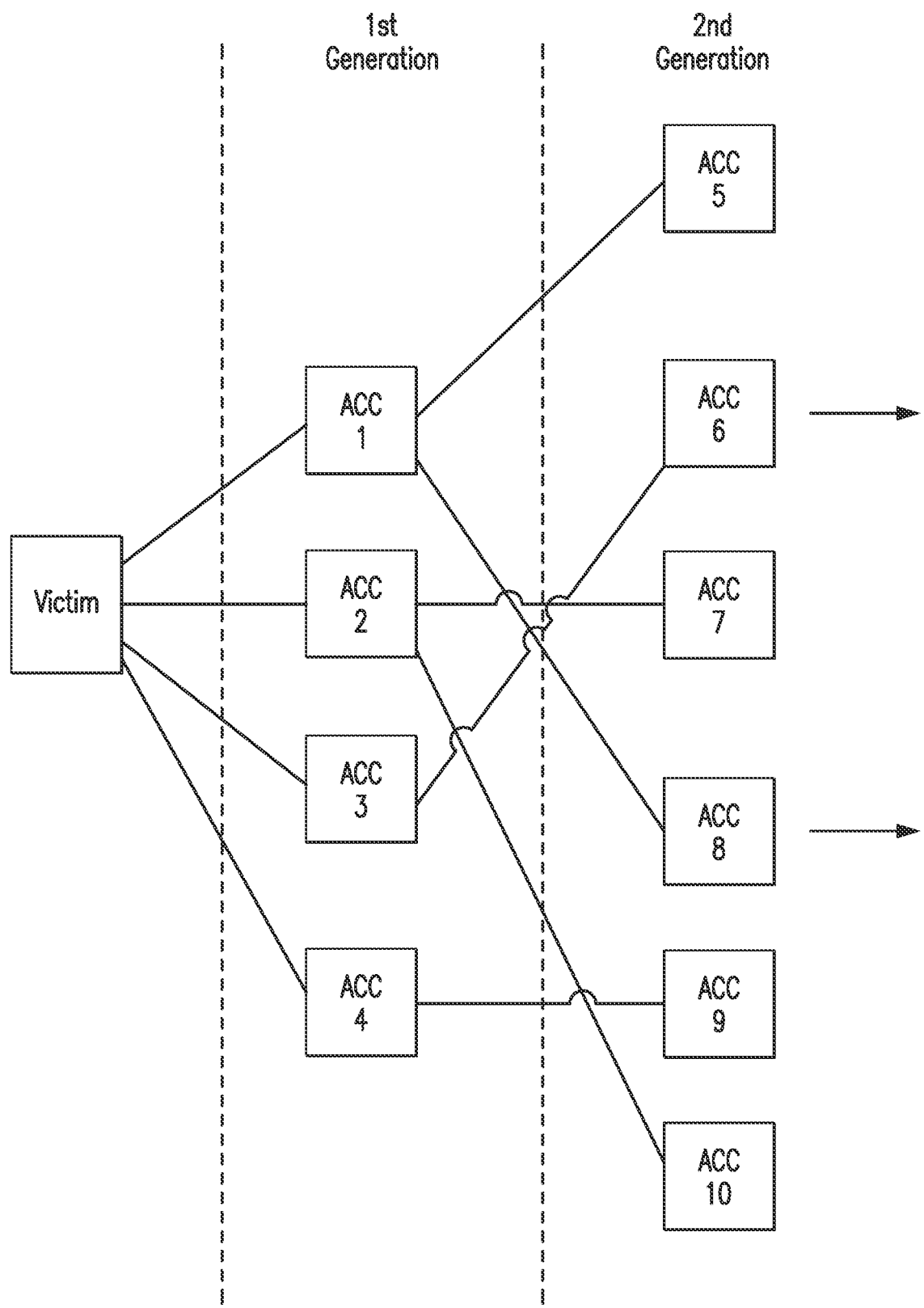

Referring to FIGS. 2A-2B, a schematic diagram showing a fraudulent transaction is shown.

The examples of the present disclosure aim to trace the flow of funds subsequent to a fraudulent transaction. In particular, one aim of the present disclosure is to trace the funds in a very efficient and quick manner. This is important given the number of bank accounts through which the fraudulently obtained money flows and the speed at which the money flows the various accounts in a fraudster's network as well as the high number of non-fraud accounts that funds may flow to. This enables the possible recovery of the money and importantly the closure of bank accounts associated with fraudulent activity in a timely fashion.

In FIG. 2A, a chart showing the dispersal of money from a fraudulent activity is shown. In particular, a victim account 205 has £100,000 stolen from their account using fraudulent means. For example, a fraudster may use one of a myriad of techniques in order to compromise the security of the account. The fraudster may contact the victim reporting to be a bank employee and to fraudulently obtain secret information which then allows the fraudster to illegally transfer £100,000 from the victim account 205.

Typically, the fraudster will utilise a transaction which allows money to be transferred between various bank accounts very quickly and within a matter of seconds or minutes.

In the example of FIG. 2A, the fraudster transfers the £100,000 of the victim's money as four transactions each of £25,000. In FIG. 2A, this is illustrated with £25,000 being allocated to account 1 210A, account 2 210B, account 3 210C, and account 4 210D. These accounts may be in the same banking organisation or may be different banking organisations. Typically, this fraudulently obtained money may be mixed with other money located in the respective bank accounts. The other money in the respective bank accounts may be legitimate money or other fraudulent money. These bank accounts are the first generation of bank accounts associated with the fraudulent activity.

Within a few minutes of the money reaching the bank accounts in the first generation of accounts, the fraudsters then transfer the money to different bank accounts which are termed second generation bank accounts. In the example of FIG. 2A, the fraudsters transfer £10,000 from account 1 210A to account 5 215A and £15,000 to account 8 215D. Similarly, the fraudsters transfer £12,000 from account 2 210B to account 7 215C and £13,000 to account 10 215F. The fraudsters transfer £25,000 from account 3 210C transfers to account 6 215B. Finally, the fraudsters transfer £25,000 from account 4 210D to account 9 215E.

As with the first generation bank accounts, each of the second generation bank accounts 215A-215F may be with the same or different banking organisations.

The process of transferring the money away then continues for possibly many generations of bank accounts. The purpose of the distribution of the money to various bank accounts is so that at a final step, the terminating bank accounts usually have smaller quantities of cash which may be extracted using an Automatic Teller Machine (ATM) or may be used to purchase goods from a shop without arousing suspicion or extracted from the terminating bank account in some way. Nevertheless, given the speed at which the money can be distributed between fraudulent accounts, the initial £100,000 stolen from the victim account 205 may be extracted and used within a few hours of the initial fraudulent transaction.

It is important to note that this does not mean that the first generation bank accounts or the second generation bank accounts have no money remaining after the transfer. Typically, the fraudster will use bank accounts having some other funds (either legitimate or illegitimate). This makes it very difficult to identify which of the money passed to the second generation bank account is associated with the initial fraudulent activity. It is therefore important to identify the bank accounts associated with fraudulent activity very quickly so that those accounts can be closed to frustrate the fraudster from performing similar fraudulent transactions.

This is especially the case since the transfer from the first generation bank accounts to the second generation bank accounts is usually carried out very quickly and within minutes of the initial fraudulent activity relating to the victim account 205.

Tracing this stolen money is very difficult using known techniques. This is because banks will typically only see money entering one account and leaving the same account a short time later; there is no indication to the bank that these transactions are linked. Additionally, as banking regulations are very tightly controlled, it is difficult to obtain information pertaining to an individual's bank account. This means tracking the money after the fraudulent activity has taken place can be very difficult. This is especially the case if the bank accounts in the fraudulent network are located in different countries.

FIG. 2B shows the network of accounts associated with the fraudulent transaction in FIG. 2A.

From FIG. 2B, it will be apparent to the skilled person in the art, that the victim bank account is a root node of a network. Each bank account within the network is therefore a node of the network. The transaction transferring the money is therefore an edge of the network. This means that the skilled person in the art may consider the network as a graph and, therefore, may implement graph theory in analysing the network.

Figure 3:
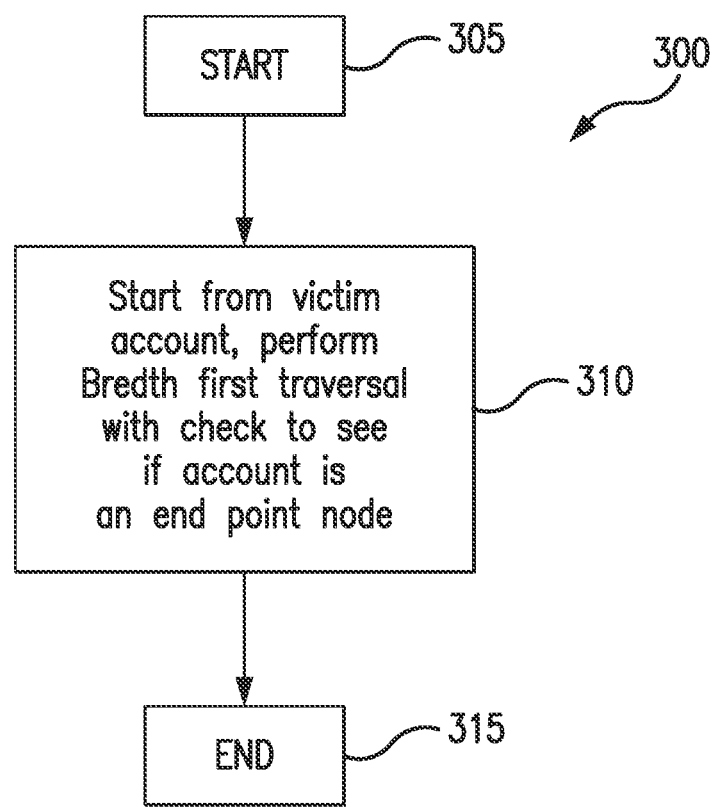
FIG. 3 shows a flow chart according to examples.

FIG. 3 shows a flowchart explaining examples of the disclosure used to trace this fraudulent activity very quickly. The flowchart 300 starts at the start block 305. The process moves to step 310. In step 310, a Breadth-First traversal of the network is carried out. In this type of traversal, the root node is processed first, then all of its children are processed next and then all of the children's children are processed next. In this traversal, in examples, a check is conducted at each node (bank account). This check determines whether the node is an end-point node. In other words, the check determines if the node is part of the fraudulent dispersal. The check of one account, according to examples, will be described with reference FIG. 4.

A brief description will follow set in the context of the examples of FIG. 2B.

The initiating fraudulent transaction from the victim account (the root node) to "Acc 1", "Acc 2", "Acc 3" and "Acc 4" (nodes) of FIG. 2B is tracked. At each of these nodes, the check of FIG. 4 is carried out as will be explained later to determine if any of the children nodes (Acc 1 to Acc 4) is an end point node of the network.

Any children nodes which are end point nodes do not form part of the fraudulent dispersal and no further tracing of transactions from that end-point node will be carried out.

On the other hand, for any of the first generation nodes which are not end point nodes, the transactions from each of the non-end point nodes are traced to a second generation of nodes (i.e. the children of those first generation nodes). These transactions may be time limited so that only transactions occurring within a period of time from the funds arriving in the account are traced. Examples of this time period include any period between 24 hours and 148 hours. As explained later, this period is statistically significant. The check of FIG. 4 is then applied to each of these second generation nodes to see which, if any, of these second generation nodes are also part of the fraudulent dispersal.

Figure 4:
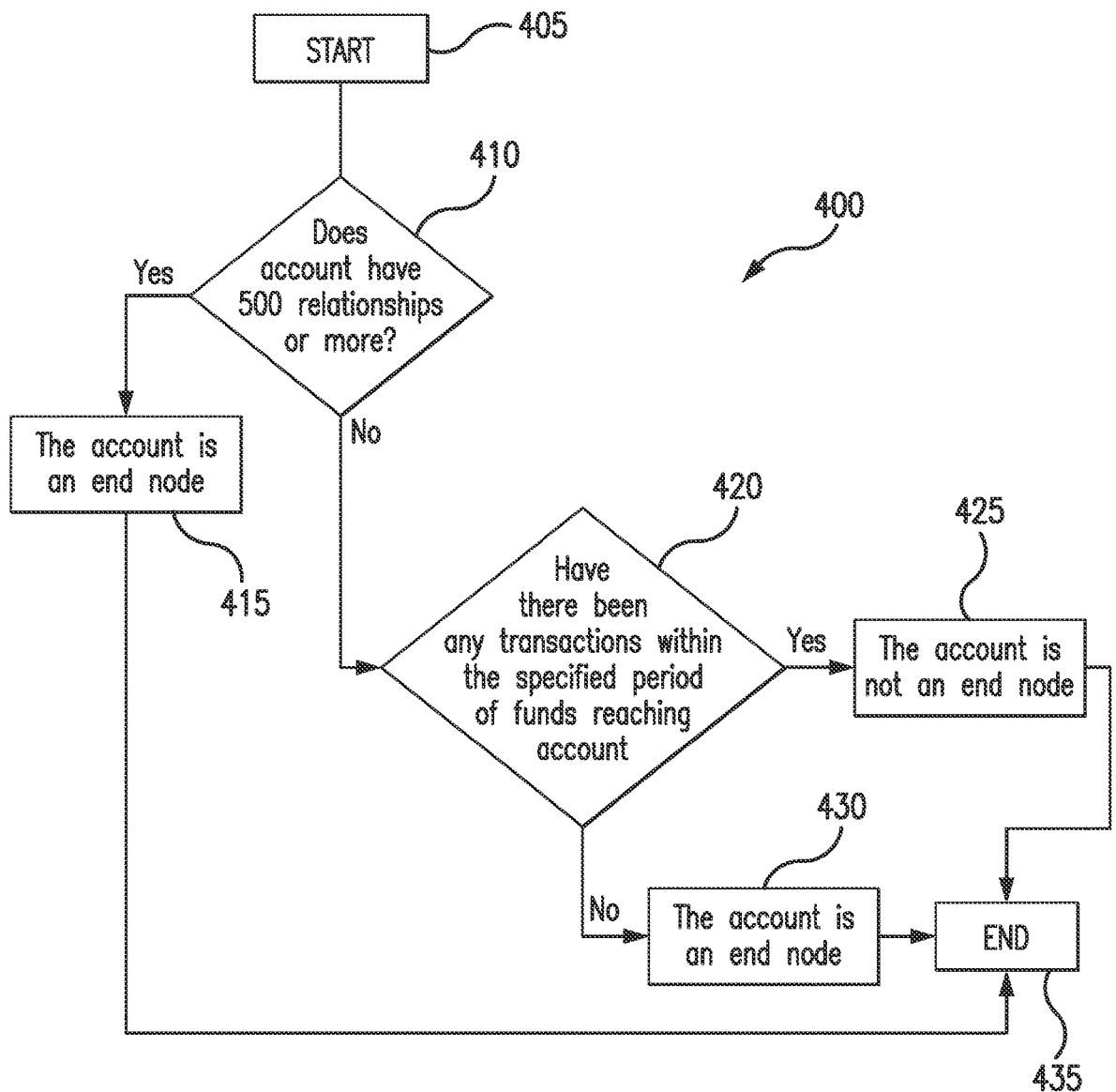
FIG. 4 shows a flow chart explaining the checking in a single account according to examples of the disclosure.

In FIG. 2B, therefore, as all of the first generation nodes (Acc 1 to Acc 4) are not end points, the check of FIG. 4 is applied to each of the second generation nodes. In other words, the check of FIG. 4 is applied to each of Acc 5, Acc 6, Acc 7, Acc 8, Acc 9 and Acc 10.

Turning to FIG. 4, examples of the disclosure are disclosed in the flow chart 400 which is a check applied to each node. This process is implemented, in examples, as computer readable code stored on storage medium 125. The process is carried out on processor circuitry 110.

The process starts at step 405. The process moves to step 410 where a first check is performed to determine whether the account under test (the node) has a predetermined number of account relationships. In some examples, the predetermined number is 500 or more account relationships. In this instance, an account relationship is set up between two accounts when a payer transfers money to a payee for the first time within the period of time of data stored in the process. This is an advantageous check because most large organisations, such as utility companies or local authority institutions (which are legitimate and so will not transfer fraudulent funds out of the account) have 500 or more account relationships. Of course, although in examples, 500 or more account relationships is chosen as the predetermined number, the disclosure is not so limited. The number may be less or more than this. However, it is noted here that the inventors have identified this number as being statistically significant.

Accordingly, in step 410, if the account has 500 or more account relationships, the yes path is followed to step 415 where it is determined that the account is an end node. The checking process then ends at step 435.

Alternatively, if the account has less than 500 account relationships, the no path is followed to step 420.

By performing this check, therefore, it is possible to quickly eliminate large organisations (which will not propagate the fraudulent money) from the remainder of check process. This reduces computational burden on the apparatus of FIG. 1 and accelerates the checking of the node.

Returning to step 420 of FIG. 4, a second decision is made. Specifically, it is determined whether there have been any transactions out of the account within a specified period of the incoming transaction to the node. For example, not only may a transaction in this instance include transferring money to another bank account, but a transaction may include a withdrawal of cash from an ATM, or a debit card purchase or the like.

In examples, the specified period is between 24 and 148 hours. This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours.

In the event that there have been outgoing transactions from the account within the specified period of time, the yes path is followed to step 425 and the account is determined to not be an end-point node. Alternatively, if there has not been outgoing transactions from the account within the period of time, the no path is followed to step 430 and the account is determined to be an end-point node.

After step 425 or 430 has concluded, the flow chart moves to step 435 where the process ends.

It should be noted here that although the foregoing describes the check includes identifying the number of account relationships followed by determining that other outgoing transactions took place a predetermined time after the inbound transaction, the disclosure is not so limited.

Specifically, each of these checks may be performed on their own to assist in tracing the fraudulent accounts. This would still achieve the effect of quickly identifying the fraudulent accounts very quickly.

Alternatively, or additionally, the ordering of the two-step check of FIG. 4 may be performed in any order.

The checking process of examples described in FIG. 4 is particularly advantageous in the field of fraud detection because the account(s) used in fraudulent transactions can be traced quickly. This allows financial institutions to be notified of accounts which are used in fraudulent and scamming activity so that money can be stopped leaving those accounts and ultimately those accounts can be closed.

In addition, the checking process of examples of FIG. 4 identifies large organisations which are not used to propagate fraudulent funds. By quickly identifying these organisations and determining that these are the end node, they are quickly removed from the tracing path. This reduces the number of nodes to be traced which reduces the time and computational resource required in tracing the money.

Once the accounts have been identified, this information is passed to the banks involved. It is important to pass this information to the banks quickly. This is because, as noted above, the banks will only ever see money being transferred into an account and money being transferred from an account. The link to fraudulent activity would only ever be identified to the bank much later on (if ever) using known techniques. However, by using examples of the disclosure, fraudulent activity is identified to the bank much more quickly. This information will be provided to the bank using the network connection 115.

Building a Set of Traceable Messages Through a Network in Real Time:

As noted above, it is desirable to trace the dispersion of funds through a network as quickly as possible. This enables rapid identification of transactions and accounts which are associated with fraudulent activity. Accordingly, a method of building a set of traceable messages through a network of nodes according to the present embodiment which may be applied to the dispersion of funds through a network of financial institutions by transactions between bank accounts associated with those financial institutions is provided. According to this present embodiment, the dispersion of funds through the network is determined more quickly and is substantially in real time, enabling rapid identification of transactions and accounts related to a transaction or account which has been reported as being linked with fraudulent activity.

Figure 5A:
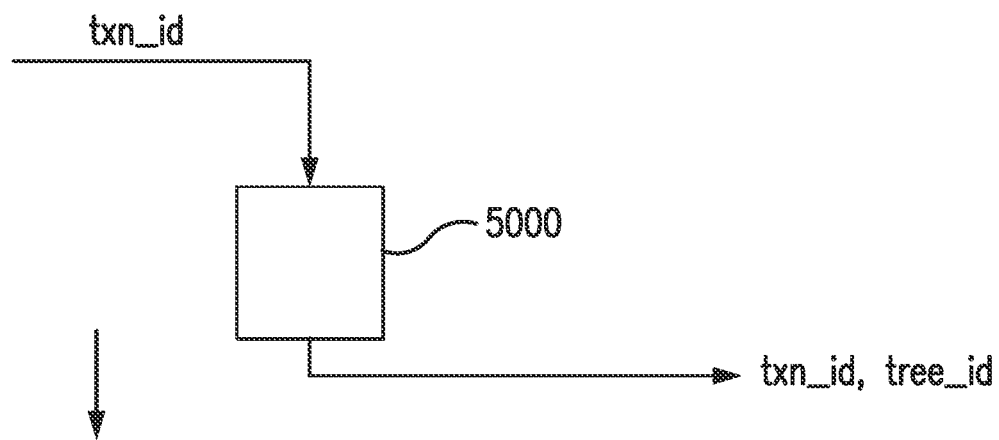
FIG. 5A illustrates an example of building a set of traceable messages according to an embodiment of the disclosure.

FIG. 5A illustrates an example of building a set of traceable messages according to this embodiment of the disclosure. In this embodiment, since the messages sent through the network 5000 relate to transactions between bank accounts the information contained in these transactions is standardised. As such, each message, or transaction, comprises a source identifier (identifying the account from which the message is sent), a destination identifier (identifying the account to which the transaction is sent). The transaction information also comprises a value in seconds indicating the time of the transaction and a unique identifier of the transaction such as a transaction identifier.

In the example depicted in FIG. 5A, the transactions between bank accounts can be considered as a stream consisting of a sequence of transactions between bank accounts. In an economy such as the UK, the number of transactions between accounts could reach a rate of around 300 transactions per second. The method according to the present embodiment converts the stream of transactions between accounts into a set of connected transactions, tracing the transfer of funds through the network. When a transaction from the stream of transactions is received, the method according to the present embodiment comprises determining a set of previous transactions through the network with which the received transaction is associated. The set of previous transactions may be referred to as a dispersion tree, as is explained in more detail below. In other words, for each transaction which is received (identified in this example by a unique identifier txn_id), an outbound message is produced which describes the set of previous messages or transactions the received transaction belongs to or is a member of.

Figure 5B:
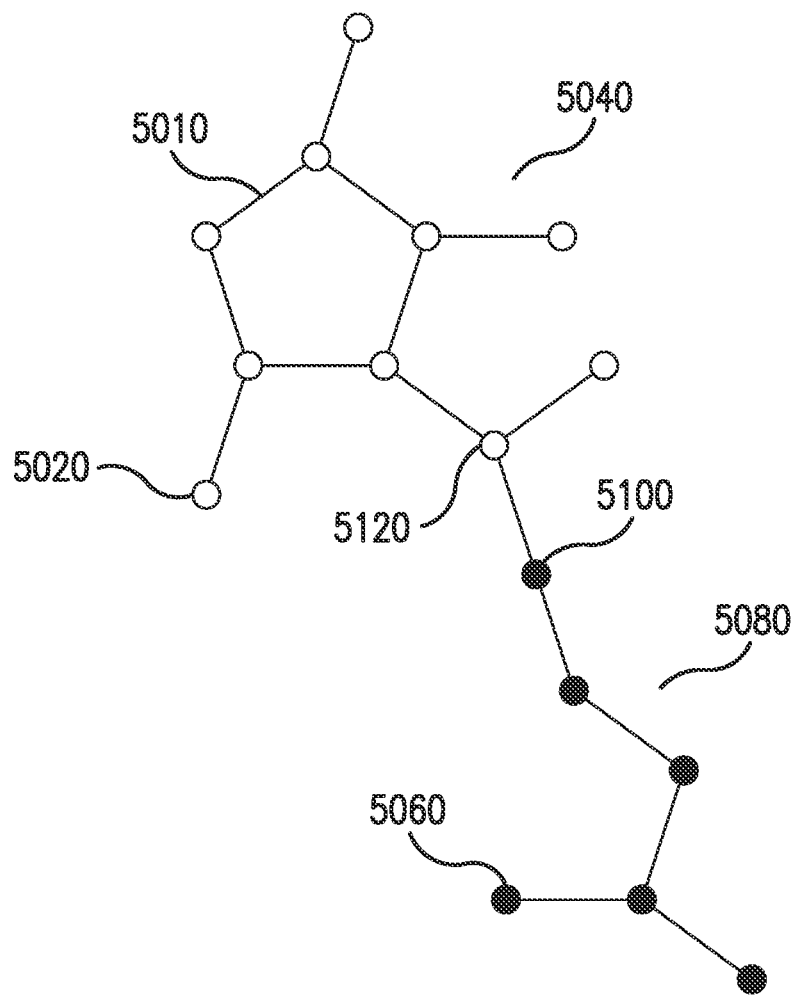
FIG. 5B depicts the connections between a set of bank accounts according to the an embodiment of the disclosure.

FIG. 5B depicts the connections between a set of bank accounts according to the present embodiment. In contrast to the FIGS. 2A and 2B, the source bank account 5020 does not necessarily relate to a bank account which has been reported as fraudulent, nor do the transactions 5010 between the accounts correspond to fraudulent transactions between these accounts. Rather, a set of connected transactions of funds through the network form a separate set of transactions within the network. That is, in the example shown in FIG. 5B, the set of transactions between accounts originating with account 5020 (indicated with the empty circles) form a first set of connected transactions 5040. In contrast, the set of transactions starting with a transaction from account 5060 form a second set of connected transactions 5080 (indicated by the filed circles). The transaction between accounts 5100 and 5120 may therefore belong to both set of connected transactions 5040 and set of connected transactions 5080 since accounts 5100 and 5120 are linked with both sets of transactions.

As described with reference to FIG. 5A, the stream of transactions is processed as each transaction is received. Accordingly, the transactions are identified and the set of traceable transactions are produced quickly and substantially in real time.

When an account, or transaction, is reported as being linked with fraudulent activity, the method according to the present embodiment enables all those accounts and transactions associated with the fraudulent activity to be rapidly identified. This enables financial institutions be notified very quickly of other accounts and transactions which are associated with fraudulent and scamming activity, such that money can be stopped leaving those accounts and ultimately those accounts can be closed.

Figure 6:
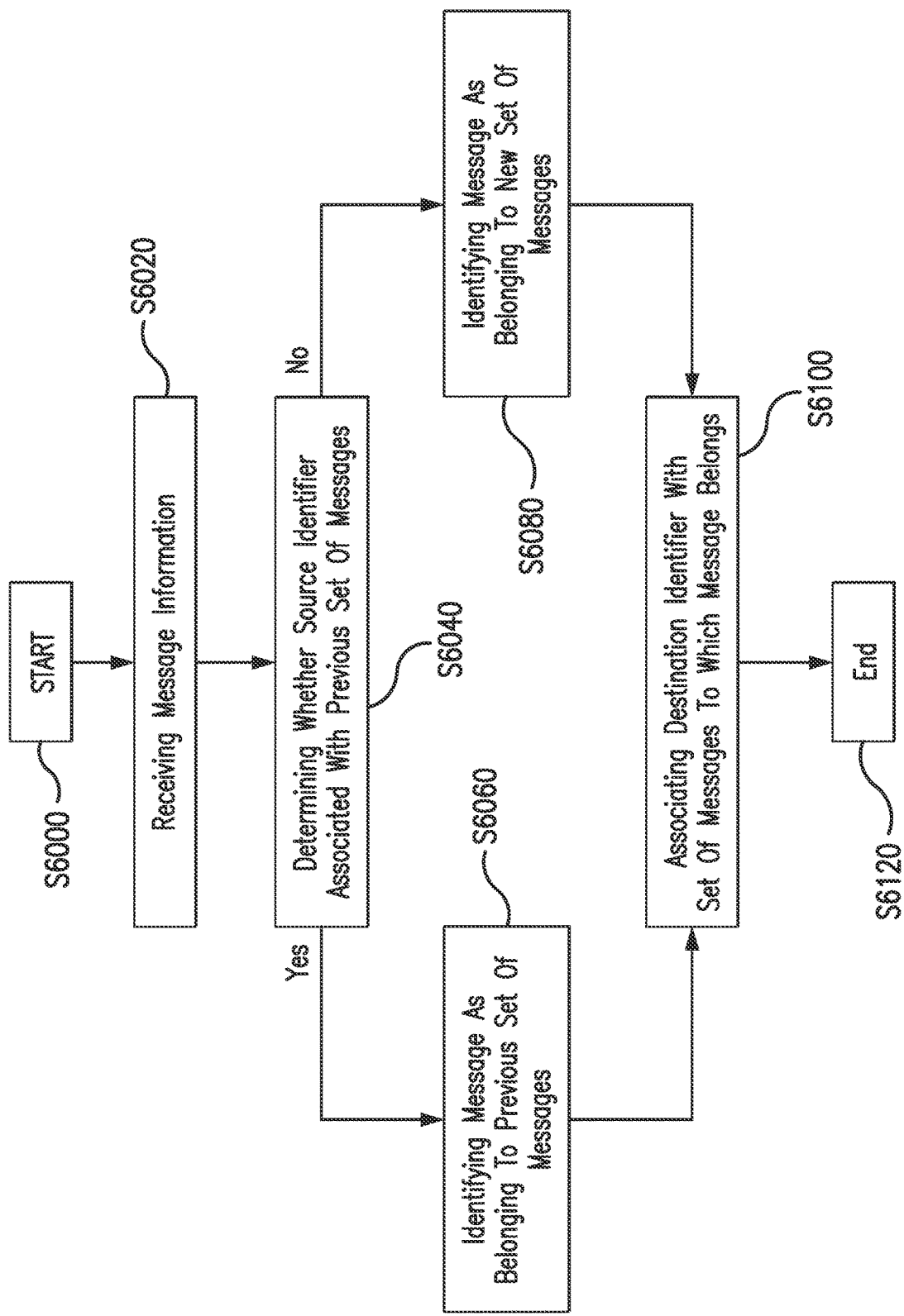
FIG. 6 illustrates a method of building a set of traceable messages through a network of nodes according to an embodiment of the disclosure.

Building a Set of Traceable Messages:

FIG. 6 illustrates a method of building a set of traceable messages through a network of nodes according to the present embodiment of the disclosure. Step S6020 comprises receiving message information corresponding to a first message, the message information comprising a first source identifier and a first destination identifier. Step S6040 comprises determining whether the source identifier is associated with a previous set of messages. When the first source identifier is associated with a set of previous messages, the method comprises identifying the first message as also belonging to the set of previous messages in step S6060. When the first source identifier is not associated with a set of previous messages, the method comprises identifying the first message as belonging to a new set of messages in step S6080. Then, in step S6100, the method comprises associating the first destination identifier with the set of messages to which the first message belongs, such that if a second message is sent from that destination, the second message will be identified as belonging to that set of messages.

The method steps S6020 to S6100 are described in detail below, with reference to the example illustrated in FIGS. 5A and 5B.

As described above, in the example depicted in FIG. 5A, the messages referred to in FIG. 6 may relate to transactions between a network of bank accounts, and as such, a set of previous messages corresponds to a set of connected transactions tracking the dispersion of a set of funds through the accounts of the network.

In this example, each bank account within the network is therefore a node of the network. The transaction transferring the money is therefore an edge of the network. This means that the skilled person in the art may consider the network as a graph and, therefore, may implement graph theory in analysing the network. Accordingly, a set of previous messages or transactions represents a tree, and may be referred to as a dispersion tree.

As previously stated, in this example, the stream of transactions is consumed transaction by transaction substantially in real time. For each transaction that is received, a single outbound message is produced which describes which dispersion tree, or set of previous messages or transactions, the received transaction belongs to or is a member of. In order to identify the dispersion tree to which an inbound transaction belongs, the method according to the present embodiment produces and maintains a set of leaves, or end points of the dispersion trees, in a storage unit A:

A: account_id→tree_id where account_id is a unique identifier which identifies the bank accounts which are part of the banking network, and tree_id is an identifier which identifies the dispersion trees as described above. After receiving transaction information in step S6020, the account_id of the bank account from which the transaction is sent, the source identifier, is checked for presence in the storage unit A in step S6040. This could be, for example, through a lookup of the source identifier in the storage unit A. It will be appreciated that the function used to perform this lookup is not particularly limited in this regard. It will further be appreciated that the account identifier according to the present example may relate to any unique identifier or combination of identifiers which identify the account to which they belong, and is not particularly limited in this regard. The method then proceeds to step S6060 or step S6080 according to the result of this determination.

When it is found that the source identifier is associated with a dispersion tree in the storage unit A, then, in step S6060, the dispersion tree with which that source identifier is associated in the storage unit A will be retrieved, and the transaction will be identified as also belonging to that dispersion tree. That is, according to the present example, the single outbound message describing which dispersion tree the received transaction belongs to may be produced at this stage.

However, when it is determined that the source identifier is not associated with a dispersion tree in the storage unit A, then, in step S6080, the method comprises identifying the first message as belonging to a new set of messages. That is, since the received transaction originated from an account which is not stored in the storage unit A, and thus is not associated with any previous dispersion trees, then it is determined that the transaction represents the start of a new dispersion of funds through the banking network. Therefore, a new dispersion tree is created, having a new dispersion tree identifier (tree_id), and the received transaction is identified as belonging to this new dispersion tree. That is, according to the present example, the single outbound message describing which dispersion tree the received transaction belongs to may be produced at this stage.

The new tree_id may be generated in accordance with transaction information corresponding to the received transaction. For example, the new tree_id may be generated based upon a unique transaction identifier identifying the received transaction or the like.

Once the received transaction has been identified as belonging either to a previous dispersion tree or a new dispersion tree as described above, the method proceeds to step S6100.

In step S6100, the account_id of the bank account to which the transaction is sent, the destination identifier, is then added to the storage unit A, being mapped against the dispersion tree to which the transaction has been identified as belonging. That is, if the transaction has been identified as belonging to a previous dispersion tree then the destination identifier be mapped against the previous dispersion tree, whereas if the transaction has been identified as belonging to a new dispersion tree the destination identifier will be mapped against the new dispersion tree.

Accordingly, if a further transaction is sent from the account having the account_id corresponding to the destination identifier of the first transaction, then the second message will also be identified as belonging to that dispersion tree.

As will be appreciated from the above described example, the method of building a set of traceable messages through a network of nodes according to the present embodiment therefore requires only a single lookup in the storage A for each transaction which is received. That is, regardless of the size of the stream of transactions, each individual transaction triggers only a single lookup of the source identifier in the storage unit A in order to retrieve any dispersion tree identifiers with which the source identifier is associated. This enables the identification of a dispersion tree to which a transaction belongs to be performed quickly and substantially in real time as the stream of transactions is consumed. As such, if a transaction is subsequently reported as a transaction of interest, being linked to fraudulent activity for example, then any accounts or transactions which are associated with that reported transaction can quickly be identified, since the dispersion tree has already been created as the stream of transactions is consumed; thus increasing the speed at which related fraudulent activity is recognised and reducing the computational burden upon the network.

The method according to the present embodiment may be performed on an apparatus (or alternatively a server) as described with reference to FIG. 1. As previously stated, this apparatus 100 is controlled using a microprocessor or other processor circuitry 110. The apparatus is connected to the network and is able to receive transaction information from each node of the network. For each transaction of the stream of transactions the apparatus 100 performs the method steps S6020 to S6100 according to the present embodiment in order that the identification of the dispersion tree to which the transaction belongs can be performed quickly and substantially in real time.

Exemplary Messages and Transactions:

FIGS. 7A-D illustrate a set of exemplary messages according to this embodiment of the disclosure.

Figure 7A:
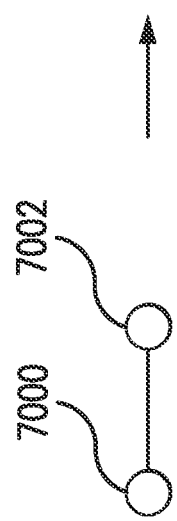
FIGS. 7A-D illustrate a set of exemplary messages according to an embodiment of the disclosure.
Figure 7B:
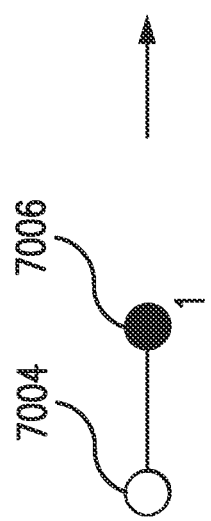
Figure 7C:
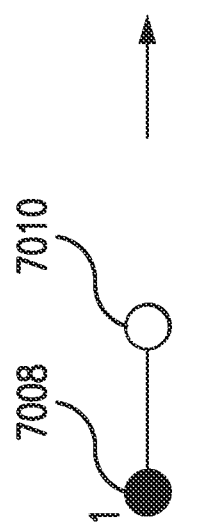

As depicted in FIGS. 7A-D, when considering a transaction between two accounts, there are four distinct possibilities: FIG. 7A) neither source account or the destination account belongs to a previous dispersion tree; FIG. 7B) the source account belongs to a previous dispersion tree, but the destination account does not belong to a previous dispersion tree; FIG. 7C) the source account does not belong to a previous dispersion tree but the destination account belongs to a previous dispersion tree and FIG. 7D) both the source account and the destination account belongs to a previous dispersion tree. In FIGS. 7A-D, an account associated with a previous dispersion tree is illustrated with a filed circle, while an account which is not associated with a previous dispersion tree is illustrated by an empty circle. Each of these situations will be considered with reference to the method described in FIGS. 7A-7D.

Consider now the first situation in FIG. 7A, where neither the source account 7000 nor the destination account 7002 belongs to a dispersion tree. The transaction information comprising the source identifier that identifies source account 7000 and the destination identifier that identifies the destination account 7002 is received in step S6020 of FIG. 6. The method according to the present embodiment then comprises determining whether the source identifier (identifying the account from which the transaction is sent) belongs to a previous set of messages or not. In this example, as stated above, the source identifier does not belong to a dispersion tree; that is, the source identifier is not associated with a dispersion tree in a storage device A storing a mapping of account identifiers to dispersion trees. Accordingly, the method proceeds to step S6080. In step S6080, since the source identifier is not associated with a previous dispersion tree, it is determined that the transaction represents the start of a new dispersion of funds (linked transactions) throughout the network. Accordingly, a new dispersion tree is generated. In this example, the generation of a new dispersion is achieved by generating a new dispersion tree identifier with which the subsequent transactions belonging to that dispersion tree will be associated. As depicted in FIGS. 7A-D, the transaction is identified as belonging to a new dispersion tree with identifier 1.

Furthermore, in this example, the destination account 7002 will then be associated with the dispersion tree to which the transaction between accounts 7000 and 7002 belongs. That is, an association between the destination identifier and the dispersion tree identifier generated in step S6080 will be stored in the storage unit A, such that if further transactions are sent from that account, those transactions will also be identified as belonging to the same dispersion tree as account 7002.

Consider now the example of FIG. 7B, where the source account 7004 does not belong to a known dispersion tree, but the destination account 7006 does belong to a known dispersion tree. In this example, the transaction information comprising the source identifier and the destination identifier is received in step S6020. In this exemplary situation, as described with reference to the first situation in FIG. 7A above, the source identifier identifying the source account 7004 is not associated with a previous set of transactions. Therefore, again as described with reference to the first situation in FIG. 7A, the method comprises identifying that the transaction represents the start of a new dispersion tree, or set of transactions, of funds through the network of accounts in step S6080. The new dispersion tree is identified by the identifier 2 in this example.

In this example however, the destination account 7006 already belongs to a previous dispersion tree (illustrated as dispersion tree 1). Since the transaction has been identified as belonging to dispersion tree 2, the destination account 7006 therefore forms a part of both the previous dispersion tree 1 and the new dispersion tree 2 generated in step S6080. Accordingly, the destination account 7006 is then associated with the dispersion tree 2 in step S6100. However, this does not remove the association between the destination account and the previous dispersion tree 1. Rather, the destination account 7006 is then associated with a plurality of dispersion trees. As such, in this example, if a further transaction is generated from the account 7006 then that transaction will be associated with both the dispersion trees 1 and 2. According to the present embodiment, in the case that a certain condition is satisfied, two separate dispersion trees may be combined into a single resultant dispersion tree. That is, for example, if a certain number of the transactions associated with a first dispersion tree overlap with a second dispersion tree, those dispersions trees could be combined such that the related transactions are identified as belonging to a single resultant dispersion tree.

Consider now the third example in FIG. 7C, representing a transaction between a source account 7008 which belongs to a previous dispersion tree 1, and a destination account 7010 which does not belong to any previous dispersion tree. In this example, transaction information comprising the source identifier and the destination identifier is received in step S6020 of FIG. 6. In step S6040 it is determined that the source identifier identifying the source account 7008 is associated with a previous dispersion tree. In this example, and in contrast to situations in FIGS. 7A and 7B described above, the method proceeds to step S6060 of FIG. 6. In step S6060, the transaction between the source account and the destination account is identified as also belonging to the dispersion tree 1 (because it originated from an account which belonged to a previous dispersion tree). That is, the dispersion of funds from account 7008 is thus linked to the previous set of transactions transferring those funds through the network. The method then proceeds to step S6100 of FIG. 6.

In step S6100 of FIG. 6, it is determined that the destination account 7010 should also be associated with the dispersion tree 1 to which the transaction between the accounts 7008 and 7010 has been identified as belonging. That is, in this example, the destination account 7010 is identified as also belonging to dispersion tree 1, such that any further transactions originating from this account will also be identified as belonging to dispersion tree 1.

Figure 7D:
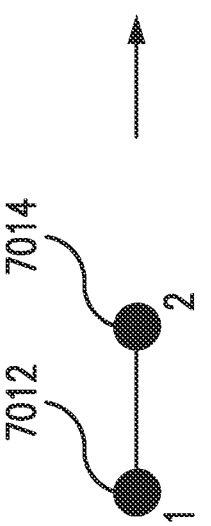

Finally, consider the situation of FIG. 7D, whereby the source account 7012 and the destination account 2014 belong to a previous dispersion tree. As illustrated in FIGS. 7A-D, the source account 7012 is associated with a previous dispersion tree 1, while the destination account 7014 is associated with a previous dispersion tree 2. In this example, the transaction information comprising the source identifier and the first destination identifier is received in step S6020 of FIG. 6. In this example, the source identifier is determined as being associated with a previous dispersion tree in step S6040. As such, the method comprises, in step S6060, associating the transaction between accounts 7012 and 7014 as belonging to that dispersion tree 1 also. The method then proceeds to step S6120 of FIG. 6.

In step S6120, the destination account 7014 is further associated with the dispersion tree 1 to which the transaction has been identified as belonging to, such that if further transactions are sent from account 7014, they will also be identified as belonging to that dispersion tree 1. If the destination account 7014 belongs to a dispersion tree which is the same as the dispersion tree to which the transaction has been identified as belonging to, then, according to the present example, this association will merely be updated in the storage unit A. However, if the destination identifier already belongs to a dispersion tree, but that dispersion tree is distinct from that which the transaction has been identified as belonging to, then the destination account 7014 will be associated with a further dispersion tree. As described above, according to the present example, this does not remove the association between the destination account 7014 and dispersion tree 2. Rather, the destination account is identified as belonging to two dispersion trees (1 and 2) such that if further transactions are sent from that account, they will be identified as belonging to both dispersion tree 1 and 2.

In summary, according to the present embodiment, the dispersion tree to which the transaction is associated is determined in accordance with the account from which the transaction originates. Furthermore, the destination account associated with that transaction is subsequently associated with that dispersion tree, such that when further transactions are sent from that account they are also identified as belonging to that dispersion tree. By consuming the stream of transactions in this manner, using the method described with reference to FIG. 6, a set of dispersion trees tracing the dispersion of funds through the network is produced quickly and substantially in real time.

Application of a Timer:

According to the above described method, once an account has been identified as belonging to a given dispersion tree, any further transaction from that account will be identified as also belonging to that dispersion tree. As such, a transaction from that account which occurs even after an extended period of time, such as several weeks or months after, will be associated as belonging to that dispersion tree. However, in the example relating to the dispersion of funds through a banking network, as described above, typically, the fraudster will utilise a transaction which allows money to be transferred between various bank accounts very quickly such as within a matter of seconds or minutes. Therefore, in this situation, transactions which occur after a predetermined time has expired are not likely connected to the same dispersal of fraudulent funds through a network.

FIG. 8 illustrates a method of building a set of traceable messages through a network of nodes according to this embodiment of the disclosure. Steps S8000 to S8100 are the same as steps S6000 to S6100 described above with reference to FIG. 6. As such, for brevity, these steps will not be described in detail again at this stage. Once the destination identifier has been associated with the set of previous messages to which the received message belongs in step S8100, the method proceeds to step S8120.

Step S8120 comprises setting a first timer which will remove the association between the first destination identifier and the set of messages to which the first message belongs after a predetermined time.

Consider, for example, the first situation as depicted in FIG. 7A where neither the source account 7000 nor the destination account 7002 belongs to a dispersion tree. In this situation, when the destination account 7002 is associated with the new dispersion tree 1 to which the transaction between the source account 7000 and the destination account 7002 has been identified as belonging to, a timer will also be set. As such, when the timer expires, according to the present embodiment, the association between the destination account 7002 and the dispersion tree 1 will be removed. Therefore, if further transactions are sent from the account 7002 after the timer has expired those transactions will not be identified as belonging to dispersion tree 1.

It is worth noting that while the association between the account and the dispersion tree is removed after the timer has expired, such that further transactions from that account will not be associated with that dispersion tree, the transactions which have already been identified as belonging to that dispersion tree will remain as identified as belonging to that dispersion tree. Accordingly, in the event of a fraudulent account or transaction being reported, it is still possible to identify the transactions connected with the reported fraud through the dispersion tree with which they are identified even after the timer has expired.

Furthermore, each account associated with a given dispersion tree will have its own timer. It is therefore necessary for the timer of every account associated with that dispersion tree to expire in order to determine that no further transactions may be identified as belonging to given dispersion tree.

In certain examples, the timer which will remove the association between the account and the dispersion tree may be set to any value in period is between 24 and 148 hours. This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours for example.

Using a timer to remove the association between the account and dispersion tree according to the present embodiment further improves the ability to track transactions (which may be fraudulent) through a network quickly and substantially in real time, since only transactions which occur within a statistically significant period will be identified as belonging to the same dispersion tree. A new distinct dispersion tree will be created if a further transaction occurs from the account after this period of time has expired.

Figure 9:
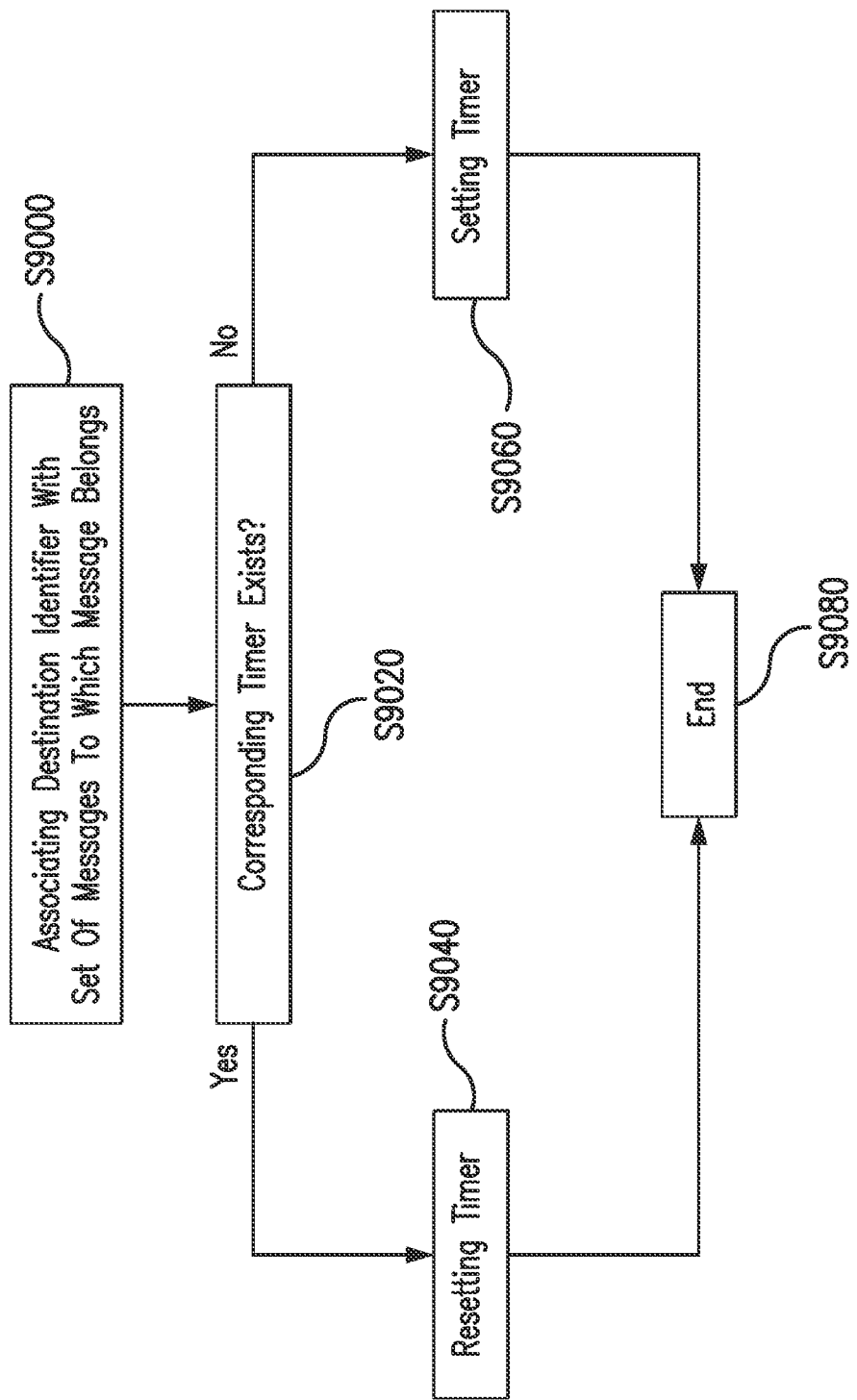
FIG. 9 illustrates a method of building a set of traceable messages through a network of nodes according to an embodiment of the disclosure.

The method according to the present embodiment may also comprise resetting the timer for a given account under certain situations. Accordingly, FIG. 9 illustrates a method of building a set of traceable messages through a network of nodes according to the present embodiment of the disclosure. Step S9000 is the same as steps S61000 and S81000 described with reference to FIGS. 6 and 8 above. It will be appreciated that Steps S6000 to S6080 have already been performed prior to the start of the method shown in FIG. 9 in step S9000.

In step S9000, as described above with reference to FIGS. 6 and 8, the method comprises associating the destination identifier with the set of messages to which the received message belongs, such that further messages sent from that account will also be identified as belonging to that set of messages. The method then proceeds to step S9020.

In step S9020 the method comprises determining whether a timer corresponding to the association between the destination identifier and the previous set of messages exists and has not expired. When a timer exists and the message has been received before the predetermined time has expired, the method proceeds to step S9040 which comprises resetting the first timer which will remove the association between the first destination identifier and the set of messages to which the first message belongs after a predetermined time. In contrast, when the timer exists and the third message is received after the predetermined time has expired, or when a timer does not exist at all, the method comprises proceeds to step S9060 which comprises associating the destination identifier with the set of messages to which the message belongs, such that if a second message is sent from that destination, the second message will be identified as belonging to that set of messages and setting a first timer which will remove the association between the first destination identifier and the set of messages to which the first message belongs after a predetermined time.

For example, consider the fourth exemplary situation in FIG. 7D, whereby the source account 7012 and the destination account 7014 belong to previous dispersion trees 1 and 2. In this case, the transaction is identified as belonging to dispersion tree 1, because the source account 7012 belongs to that dispersion tree. As described above if the destination identifier already belongs to a dispersion tree, but that dispersion tree is distinct from the dispersion tree which the transaction has been identified as belonging to, then the destination account 7014 will be associated with a further dispersion tree and a timer will be set to remove that association after the predetermined time has expired. However, according to the present example, if the destination account 7014 has already been identified as belonging to that dispersion tree 1, and the timer corresponding to that dispersion tree has not expired, then the timer corresponding to that dispersion tree will be reset. Accordingly, further transactions from that account which occur within the predetermined time will continue to be associated with that dispersion tree.

In this manner, the method according to the present embodiment converts the stream of transactions between accounts into a set of dispersion trees tracing the transactions between accounts, while maintaining an active set of end-points, or leaves, of the transactions. If further transactions associated with that dispersion tree do not place further funds into an account associated with that dispersion tree within the predetermined time then that account will be removed from the set of active leaves of the dispersion tree. Accordingly, it is possible to ensure that transactions which are not temporally connected within the predetermined time as defined above will not form part of the same dispersion tree, thereby improving the ability and speed of tracing the dispersion of transactions through a network.

Storage of the Transaction Identification:

Returning now to the example of the stream of transactions which are received in the UK banking network, as described with reference to FIGS. 5A and 5B above. The stream of transactions is consumed transaction by transaction, as described above, quickly and substantially in real time. That is, when a transaction is received, the dispersion tree to which the transaction belongs is identified through the method described with reference to the method described in FIG. 6, FIG. 8 and FIG. 9 above. That is, when the transaction is identified as belonging to a particular dispersion tree (either a previous dispersion tree or a new dispersion tree) a single outbound message is produced describing to which dispersion tree, or set of previous messages or transactions, the received transaction belongs or is a member of.

Figure 10:
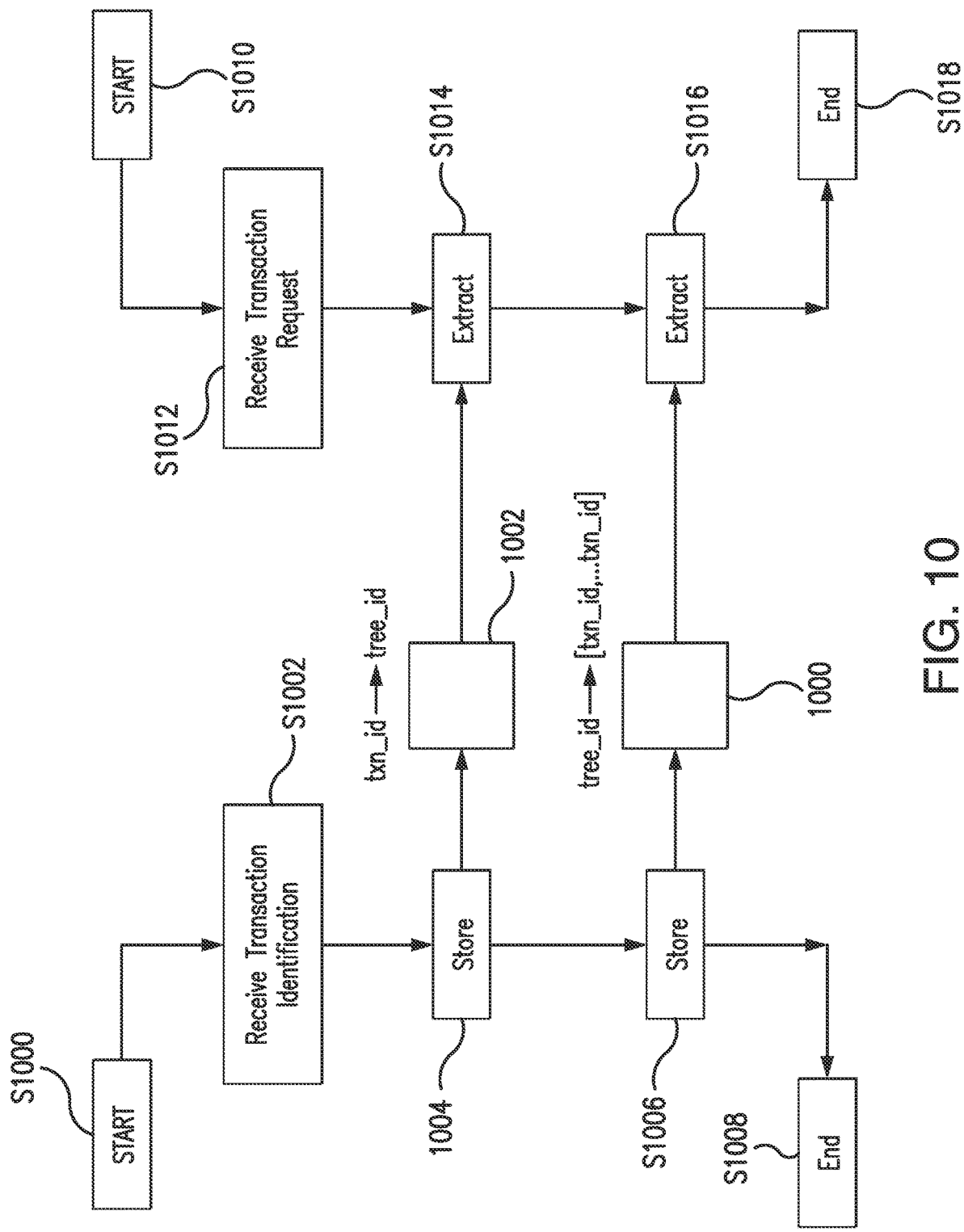
FIG. 10 illustrates a method of storing and retrieving transaction identification according to an embodiment of the disclosure.

FIG. 10 illustrates a method of storing and retrieving transaction identification according to the present embodiment. Steps S1000 to S1008 describe the method of storing the mapping between the transaction and the dispersion tree in storage units B 1002 and C 1000 as described above. In contrast, method steps S101 to S1018 describe the method of retrieving the mapping between the transaction and the dispersion tree from the storage units B 1002 and C 1000 in response to receiving a transaction request such as a request to identify all transactions linked with a fraudulent transaction.

The method of storing the mapping between a transaction and a dispersion tree upon identification that the transaction belongs to the dispersion tree according to the present embodiment will first be described with reference to steps S1000 to S1008 of FIG. 10.

When a message, or in this example a transaction, is identified S1002 as belonging to a previous set of transactions (or dispersion tree), a mapping between the transaction and the corresponding dispersion tree is created and stored in the storage unit B (step S1004):

B: txn_id→tree_id where txn_id is a unique identifier of the transaction and tree_id is a unique identifier of a dispersion tree, or set of previous transactions, to which the transaction belongs. Every new transaction which is received in the stream of transactions is added to the mapping stored in B in this manner. It will be appreciated that, in accordance with the exemplary situations described with reference to FIGS. 7A-D above, the transaction may be mapped to a plurality of tree_id where the transaction is identified as belonging to a plurality of dispersion trees.

As the stream of transactions is consumed and a transaction is identified as belonging to a given dispersion tree, for example when the mapping between the txn_id and the tree_id is added to B, a corresponding mapping is also created which stores every dispersion tree against all the transactions which are associated with that transaction in a storage unit C (step S1006):

C: tree_id→[txn_id, txn_id . . . txn_id]

Accordingly, the storage C maintains a list of all the transactions which are associated with a given dispersion tree, while the storage B maintains a list of all the dispersion trees which are associated with a given transaction. Where, as described above, the transaction is identified as belonging to a number of dispersion trees, and then the txn_id corresponding to that transaction will be added to the mapping stored in C separately for each dispersion tree with which the transaction has been identified.

In this manner as the stream of transactions is received and processed according to the present embodiment, and each transaction is identified as belonging to a given dispersion tree as described above, a storage of the mapping between the transaction and associated dispersion tree can also be created quickly and substantially in real time.

Extraction of Transaction Identification:

The method of retrieving or extracting the mapping between a transaction and a dispersion tree according to the present embodiment will now be described with reference to method steps S1010 to S1018 of FIG. 10.

In step S1012 a transaction request is received. That is, a unique identifier identifying a transaction of interest is received. According to some exemplary situations, this could be in response to the transaction as being reported with fraudulent activity. When the unique identifier of the transaction is received, the method proceeds to step S1014.

In step S1014, the method comprises determining a set of transactions associated with the received transaction request. That is, the method comprises extracting from the storage unit B the tree_id which is associated with the given transaction identified by txn_id. If the transaction is associated with a number of dispersion trees, then the tree_id corresponding to each of those distinct dispersion trees will be extracted from the storage unit.

Once the tree_id has been extracted in step S1014, the method proceeds to step S1016. In step S1016, the method comprises retrieving the list of transactions which are associated with the set of transactions in the storage unit C. That is, the method comprises extracting from the storage unit C the txn_id of every transaction which is associated with the corresponding tree_id. If a plurality of tree_id are extracted from the storage unit in S1014, then the txn_id of every transaction which is associated with the corresponding tree_id will be retrieved in turn. These transactions may then be reported back in response to the received transaction request.

Therefore it will be appreciated that, according to the present embodiment, a single lookup is required in B for a transaction which has been reported as fraudulent, and a single lookup in C is required for each dispersion tree with which the fraudulent transaction is associated in order to determine those transactions that are linked with the reported fraudulent transaction. The time required for fraudulent transactions which are linked with the reported fraudulent activity to be identified according to the present embodiment is further reduced. This therefore increases the speed of the network at identifying fraudulent transactions which are linked with reported fraudulent activity.

Exemplary Identification of Transactions Associated with a Fraudulent Transaction:

In the case that a message has been determined as a message of interest it is required that rapid identification of the messages which are associated with that message can be rapidly obtained. For example, in the case of a banking network, if a transaction has been reported as fraudulent, or has been linked to a fraudulent account, then it is necessary to rapidly identify other transactions which are associated with that banking transaction or account. This is important because once accounts linked with the fraudulent activity have been identified those accounts can be closed to frustrate the fraudster from performing similar fraudulent transactions. It will be appreciated that the manner of detecting the initial fraudulent activity according to the present embodiment is not particularly limited.

Figure 11:
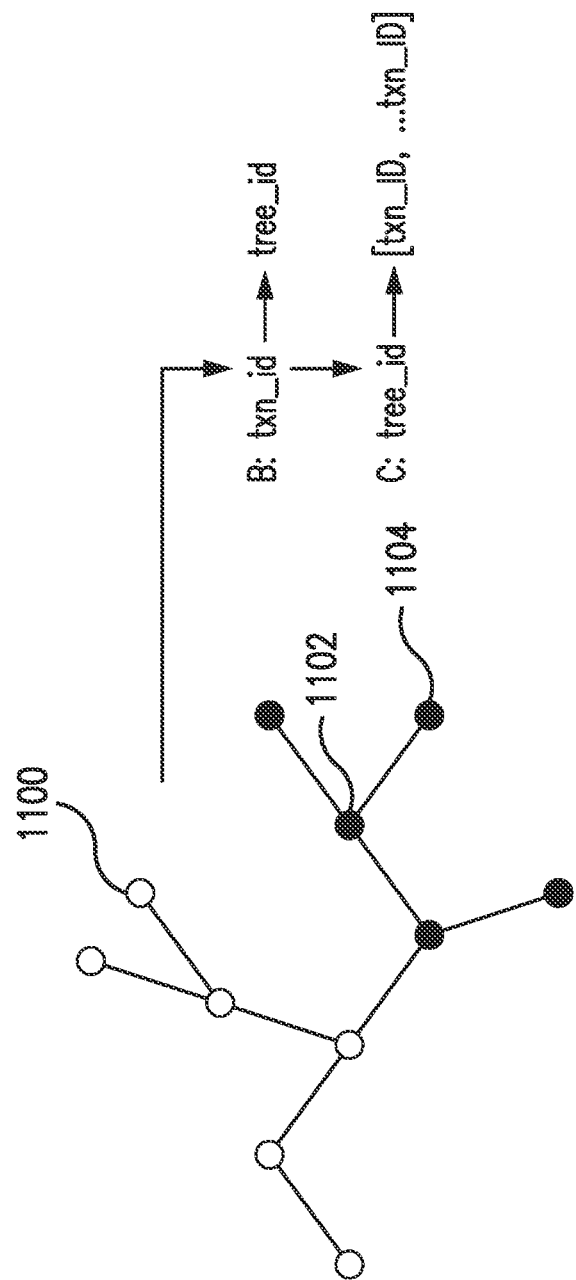
FIG. 11 illustrates a series of transactions between bank accounts which have been processed into a set of dispersion trees according to an embodiment of the disclosure.

FIG. 11 illustrates a series of transactions between bank accounts which have been processed into a set of dispersion trees according to the present embodiment. Here, as with reference to FIG. 5B above, the bank accounts may all be associated with a single financial institution, or may instead be associated with a plurality of financial institutions. It will be appreciated that the stream of transactions has been consumed substantially in real time, and according to this example, a mapping between the transactions and dispersion trees have been stored in storage units B and C as described above.

In this example, at a time t seconds after the stream of transactions has been consumed, the transaction between bank account 1102 and bank account 1104 is reported as being linked to fraudulent activity. At this time, it is necessary to rapidly identify the dispersal of the funds from the fraudulent activity through the banking network. Upon receiving a unique identifier of the transaction between bank accounts 1102 and 1104, which has been reported as fraudulent, the method according to the present embodiment comprises performing a single lookup for that transaction in the storage unit B. That is, a single lookup is performed in B which returns the tree_id of the dispersion tree, or dispersion trees, with which the transaction has been associated.

Once the tree_id with which the fraudulent transaction is associated has been retrieved from the mapping stored in B, the method according to the present embodiment comprises performing a second lookup in the storage unit C. That is, a further lookup is performed in the mapping stored in C which returns a list of all the transactions which belong to the tree_id which has been retrieved from B.

Therefore, in the example illustrated in FIG. 11, once the transaction between bank accounts 1102 and 1104 has been reported as being a transaction associated with fraudulent activity, those transactions which are associated with that transaction (by virtue of belonging to the same dispersion tree) can rapidly be identified. In this example, the transaction belonging to the same dispersion tree as the transaction between accounts 1102 and 1104 are indicated by the filled circles.

While the above method of identifying transactions has been described in relation to a reported fraudulent transaction, it will be appreciated that the lookup in B could also be initiated through a reported fraudulent account or the like, and is not particularly limited in this regard.

The speed at which fraudulent transactions that are linked with the reported fraudulent activity can be identified according to the present embodiment is further increased. That is, because the dispersion of funds through the network has been constructed quickly and substantially in real time using the method according to the present embodiment, when a transaction has been reported as fraudulent no further calculations are required in order to trace the dispersion of funds through the network; increasing the speed at which related fraudulent activity is recognised and reducing the computational burden upon the network Rather, according to the present embodiment, the connected transactions can simply be retrieved through a small number of lookups. Typically, owing to the limited number of lookups required in response to a fraudulent transaction being reported, the identification of the linked transactions can be performed in a matter of milliseconds. As such those accounts linked with the fraudulent transaction can be rapidly closed or deactivated in order to frustrate the fraudster from performing any further fraudulent transactions.

Additional Modifications of the Embodiment

As described above, when an account associated with a dispersion tree, it may be advantageous to include a timer such that only transactions from that account which occur within a predetermine time of the given transaction are identified as belonging to the same dispersion tree. Typically, as described above, the timer may be set to any value in period is between 24 and 148 hours for example. This period is statistically significant because this identifies the typically rapid diffusion of fraudulent transactions whilst ignoring the natural flow of non-fraudulent transactions such as utility bill payments or the like. Once all the accounts associated with a given dispersion tree have been removed from the mapping in storage A, no further transactions in the stream of transactions can be identified as belonging to that dispersion tree.

Accordingly if, after a predetermined time, a dispersion tree is associated with only a single transaction, then it can be determined that no further transactions can be associated with that dispersion tree. For example, if after a predetermined time of a tree_id being added to the storage unit C that tree_id is mapped only to a single txn_id, then it can be determined that no further txn_id will be added to the mapping. It will be appreciated that the predetermined time can be set at any time, but should be set in accordance with the time set for the first timer associated with that dispersion tree described above.

Once it has been determined that no further transactions can be associated with that tree_id, and that tree_id is mapped to only a single txn_id in the storage unit, then the method according to the present embodiment may comprise removing from C the corresponding tree_id.

Furthermore, at this time, the method comprises removing from B the corresponding single txn_id which was associated with that tree_id. The data stored in B and C is thus reduced.

Consider the case whereby a txn_id which has been removed from the mapping stored in B is subsequently reported as being linked to a fraudulent activity. According to the present embodiment, a single lookup will subsequently be performed in B in order to identify the dispersion tree with which that fraudulent transaction is identified; this dispersion tree would then be used in order to identify all the transactions which are associated through a lookup of that dispersion tree in the storage C. However, upon performing the initial lookup in B in response to the fraudulent activity being reported, no dispersion tree would be returned since the txn_id has been removed from the mapping stored in B. According to the present embodiment, it can then be determined that no further transactions occurred within the predetermined time of the fraudulent transaction or fraudulent activity. That is, it can be determined that no further fraudulent transactions are associated with that fraudulent transaction or fraudulent activity.

By removing the mapping between the from the txn_id and tree_id from the storage units B and C respectively, it is possible to significantly reduce the storage requirements necessary to perform the method of building a set of traceable messages through a network of nodes according to the present embodiment. Consider, for example, the stream of transactions between bank accounts in the UK. As previously stated, in an economy such as the UK, the number of transactions between accounts could reach a rate of around 300 transactions per second. Moreover, of these transactions, the vast number will be transactions of the kind above whereby, after a predetermined time, they are the only transaction associated with a given dispersion tree. As such, by removing these transactions and corresponding dispersion trees from the storage units B and C as according to the present embodiment, the storage requirements according to the present embodiment can be significantly reduced.

While the method according to the present embodiment has been described with reference to financial transactions between bank accounts in a banking network such as that described with reference to FIG. 5, it will be appreciated that present disclosure is not so limited in this respect. That is, the messages according to the present embodiment could relate to any type of financial transaction between bank accounts or financial institutions made by any method such as Faster Payments, BACS transfers or the like. Alternatively, the method according to the present embodiment could be used to construct a set of traceable messages with relation to any message or transaction, and is not so limited to financial transactions. For example, the method according to the present embodiment could be applied to building a set of traceable messages through a mobile communications network or the like.

Tracing Messages Through a Network of Nodes Using a Trace Request:

As noted above, it is desirable to trace the dispersion of funds through a network as quickly as possible. This enables rapid identification of transaction and accounts associated with fraudulent activity. Furthermore, it is desirable to provide an increased level of privacy and security, particularly with regards to the information relating to the dispersion of funds through the network. Accordingly a method for tracing a set of messages through a network of nodes is provided. The method of tracing messages through a network of nodes according to the present embodiment may be applied to the dispersion of funds through a network of financial institutions by transactions between bank accounts associated with those financial institutions. According to the present embodiment, the dispersion of funds through the network is determined quickly and substantially in real time, as the stream of transactions is received. Furthermore, according to this embodiment of the disclosure, the method of tracing messages can be applied by to a distributed system of nodes such that each the identification of the messages is performed locally at each node without the requirement for a central node or database thus reducing the integration costs and increasing network privacy and security.

Figure 12:
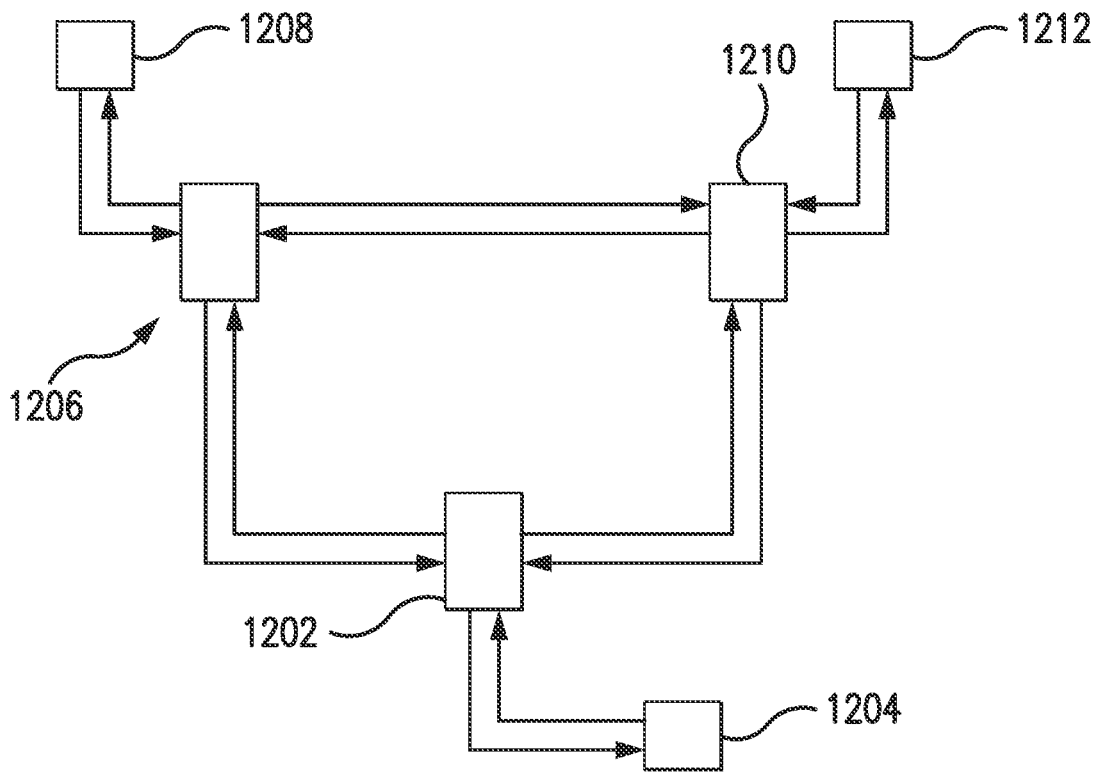
FIG. 12 illustrates an exemplary application of the method of tracing messages through a network of nodes according to an embodiment of the disclosure.

FIG. 12 illustrates an exemplary application of the method of tracing messages through a network of nodes according to the present embodiment of the disclosure. In this example, the network of financial institutions 1202, 1206 and 1210 (or nodes) are provided in a distributed manner, without any central node or database. That is, each of the respective financial institutions is in communication with, and capable of sending and receiving transactions to and from, all the other financial institutions in the network. Furthermore, each of the financial institutions may have a plurality of bank accounts associated with it. As such, for example, a transaction may be sent from a bank account associated with financial institution 1204 to a bank account associated with financial institution 1208 or 1212 respectively. It will also be appreciated that a transaction may relate to a transaction between two bank accounts associated with the same financial institution.

Each of the financial institutions 1202, 1206 and 1210 illustrated in FIG. 12 may be located in the same geographical area, or may alternatively be located in different geographical areas having distinct legislative or regulatory restrictions. That is, while the financial institutions are in communication with each other, such that transactions may be exchanged between them, there is no restriction upon the geographical locations of those institutions. By means of an example, financial institution 1202 may be located within a geographical area such as the UK, while financial institution 1206 or 1210 may be located in a different geographical area such as the USA. By providing the method according to the present embodiment in this distributed manner, the respective data held and processed by each financial institution can be governed by the legislative or regulatory restrictions of the area in which the financial institution is located, without any requirement to transfer the data or information to a central node or database of an analytics provider.

That is there is no central node which performs the method of building a set of traceable messages as transactions are sent between the financial institutions. Rather, each financial institution is in communication with a local device belonging to that financial institution. That is, financial institution 1202 is in communication with device 1204, financial institution 1206 is in communication with device 1208 and financial institution 1210 is in communication with device 1212. The device may be integrated within the respective financial institution, or may be located outside the financial institution as illustrated within FIG. 12. It will be appreciated that this device may be a device such as the device or apparatus described with reference to FIG. 1.

All the transactions which a financial institution such as 1202 engages in are notified to the respective device 1204. That is, when the financial institution 1202 sends a transaction to financial institution 1206, the device 1204 will be notified of transaction information regarding the sent transaction. Conversely, when financial institution 1206 receives the transaction, the device 1208 will be notified of transaction information regarding the received transaction. However, financial institution 1210 and corresponding device 1212 will not receive any notification of this transaction or transaction information at this stage. Accordingly, the devices 1204, 1208 and 1212 receive transaction information relating to each transaction in which the corresponding financial institution participates.

As previously stated, in an economy such as the UK, the number of transactions between accounts could reach a rate of around 300 transactions per second. Accordingly, when a transaction is identified as belonging to fraudulent activity it becomes difficult to identify other transactions with which that transaction is associated. This is, in part, because banks will typically only see money entering one account and leaving the same account a short time later; there is no indication to the bank that these transactions are linked. Additionally, as banking regulations are very tightly controlled, it is difficult to obtain information pertaining to an individual's bank account. This means tracking the money after the fraudulent activity has taken place can be very difficult. This is especially the case if the bank accounts in the fraudulent network are located in different countries.

Furthermore, typically, the fraudster will utilise a transaction which allows money to be transferred between various bank accounts very quickly and within a matter of seconds or minutes. As such, once a transaction has been reported as fraudulent, it is necessary to rapidly identify the accounts and transactions linked with that fraudulent transaction, such that action can be taken to frustrate the fraudster from preforming further fraudulent transactions.

According to the present embodiment, when a bank or financial institution engages in a transaction, the device associated with that financial institution identifies a set of previous messages or transactions with which the transaction is associated. For example, as the financial institution 1202 engages in a stream of transactions, the device 1204 determines quickly and substantially in real time the set of previous transactions with which each transaction is identified. As such, quickly and substantially in real time, the financial institutions build a graph of the dispersion of funds through the network. In this example, each financial institution within the network is therefore a node of the network. As described above, the skilled person in the art may consider the network as a graph and, therefore, may implement graph theory in analysing the transactions between accounts in the network. Accordingly, a set of previous messages or transactions represents a tree of the dispersion of funds through the network, and may be referred to as a dispersion tree.

According to this embodiment of the disclosure, each financial institution constructs and stores only a portion of the dispersion tree that represents the flow of funds, via transactions between accounts, through the network 1200 as a whole. That is, in this example, the device 1204 associated with financial institution 1202 will know of and construct the portion of total dispersion tree of the network which relates to the transactions which financial institution 1202 has engaged in, while device 1208 will know of and construct the portion of the total dispersion tree of the network relating to the transactions in which financial institution 1206 has participated.

In response to a transaction being reported as a fraudulent transaction, the person interested in obtaining information regarding transactions related to that fraudulent transaction may therefore send a request across the network 1200. In response to receiving the request, the device connected to each financial institution may, as described in more detail below, provide information relating to the corresponding part of the dispersion tree which it holds. Accordingly, in this example, in response to a fraudulent transaction being reported, it is possible to rapidly identify any transactions or accounts related to a transaction or account which has been reported as being linked with fraudulent activity.

Owing to the method of tracing messages through a network of nodes according to the present embodiment, the requirement for a centralised database and device is removed. As such, even if a single node or nodes are unavailable (owing to system failure or the like) at least a portion of the dispersion tree relating to a transaction of interest can still be obtained. Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

Furthermore, the method of tracing messages through a network of nodes according to the present embodiment requires no additional data sharing agreements between the nodes of the network, since the only additional information communicated across the network is the dispersion tree identifier. As such, the implementation costs and data sharing agreements required for tracing messages through a network of nodes is reduced.

The method according to the present embodiment will be described in more detail with reference to FIG. 13 below.

Figure 13:
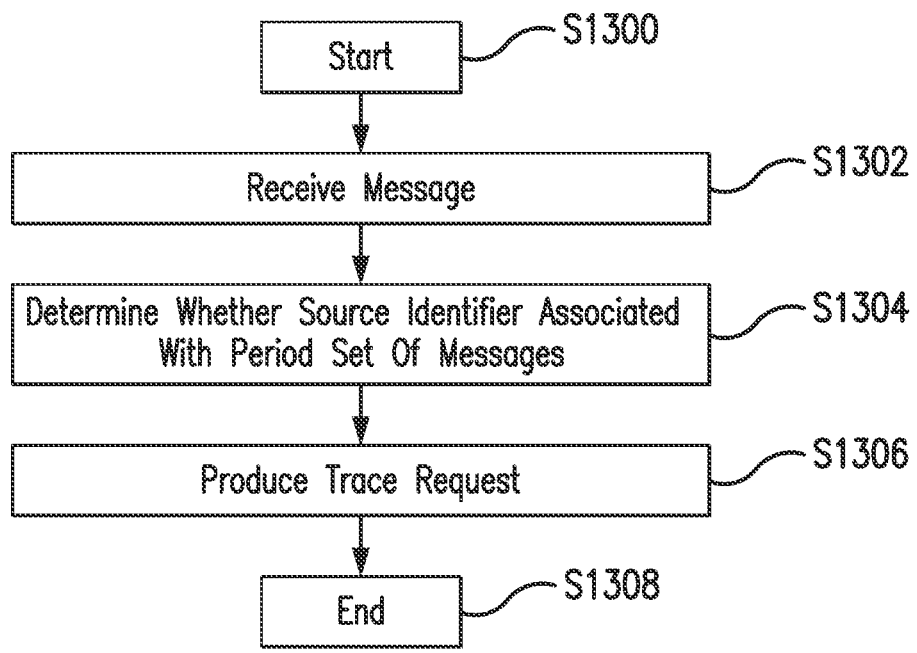
FIG. 13 illustrates a method of tracing messages through a network of nodes according to an embodiment of the disclosure.

Tracing Messages Through a Network of Nodes:

FIG. 13 illustrates a method of tracing messages through a network of nodes according to the present embodiment of the disclosure. Step 1302 comprises receiving message information corresponding to a first outbound message, the message information comprising a first source identifier and a first destination identifier; step 1304 comprises determining whether the first source identifier is associated with a set of messages in a storage unit. Step 1306 comprises producing a trace request, the trace request comprising the first destination identifier and an identifier identifying the set of messages associated with the first source identifier when it is determined in step 1304 that the when the first source identifier is associated with a set of messages.

As described above, in the example depicted in FIG. 12, the messages referred to in FIG. 13 may relate to transactions between a network of bank accounts. In this case, a set of previous messages corresponds to a set of connected transactions tracking the dispersion of a set of funds through the accounts of the network. In such an example, the information contained in a transaction between the bank accounts of one or more financial institutions must include a source account identifier (identifying the account from which the transaction originates) a destination account identifier (identifying the account to which the transaction is made), the time of the transaction and a unique transaction identifier which can be used in order to identify the transaction.

Outbound Transaction

When a bank account associated with a financial institution 1202 generates a transaction, referred to as an outbound transaction, the transaction information is sent to the corresponding device 1204. Upon receiving this transaction information (step S1302), the device must then determine whether the source identifier (the account from which the transaction originates) is associated with a set of messages stored in the storage unit (step S1304). That is, the device will determine whether the account has transaction is to be associated with a previous dispersion of funds through the network.

When it is determined that the account is a traced account, that is, an account which is associated with a previous dispersion tree, then the device produces a trace request, the trace request comprising the first destination identifier (the account to which the message is being sent) and the dispersion tree identifier which is associated with the source identifier in the storage unit (step S1306). This trace request is subsequently sent to the financial institution receiving the transaction.

According to the present embodiment, for each message which is produced by a financial institution which is associated with a previous set of transactions, a corresponding trace request is produced which associates the destination account with that previous set of transactions.

As previously stated, in this example, the stream of transactions is consumed by each device (corresponding to financial institutions 1204, 1208, 1212) as each transaction is generated quickly and substantially in real time. That is, a state is maintained at each device, mapping each account belonging to that financial institution to any corresponding dispersion trees. The mapping is stored in a storage unit A:

$$A = a \rightarrow [\text{tree\_id}_1, \text{tree\_id}_2, \ldots] \; a \in B$$

where a is an unique identifier of a bank account, tree_id is a unique identifier of a dispersion tree and B is the sent of accounts which belong to the corresponding financial institution. Therefore, if there is an outbound transaction with an account identifier stored in a (being an account which belongs to the set of account associated with that financial institution), then the method according to the present embodiment comprises determining the dispersion tree identifiers associated with that transaction, and producing a trace request with the destination identifier and any dispersion identifiers associated with that transaction. It will be appreciated that where a source account identifier is associated with a plurality of dispersion tree identifiers, the trace request will comprise the destination identifier and each of the plurality of dispersion tree identifiers which are associated with the destination identifier in A. Furthermore, at this stage, the transaction is identified as belonging to the dispersion tree with which the source account has been identified. This identification could be stored at the source financial institution or the receiving financial institution.

In this manner, if an account is associated with a previous dispersion tree, the financial institution which receives the transaction will be informed of that association such that the dispersion of the funds throughout the network may be tracked quickly and substantially in real time. If further transactions are then sent from that destination account, then they will also be identified as belonging to the same dispersion tree as the original transaction and source identifier. In other words, by producing a trace request comprising a first destination identifier and a dispersion tree identifier as according to the present embodiment, the dispersion of funds through the network can be tracked locally at each node of the network leading to enhanced levels of privacy and network security.

Exemplary Modes of Tracking Dispersion:

In some exemplary applications of the present embodiment, the method may comprise tracking all dispersion of funds through the network. In this case, if the source account is not associated with a previous set of messages a trace request comprising the first destination identifier and the identifier identifying the new set of messages will be produced. That is, where the account from which the transaction is being sent is not associated with a previous dispersion tree, then it is determined that the transaction relates to a new dispersion of funds through the network and a new dispersion tree is created having a new dispersion tree identifier (that is, a new tree_id). The identifier for this new dispersion tree is then included in the trace request which is produced according to the present embodiment in response to the outbound transaction.

The new tree_id may be generated in accordance with transaction information corresponding to the outbound transaction. For example, the new tree_id may be generated based upon a unique transaction identifier identifying the received transaction or the like.

In this example, each transaction for which the source identifier is not already associated with a dispersion tree in the storage unit A of the given bank or financial institution is treated as a trace request. That is, for each transaction for which the source identifier is not already associated with a dispersion tree in the storage unit A, a new tree_id will be created.

In other exemplary applications of the present embodiment, it may only be required to trace the dispersion of funds through the network where those funds (or the account with which they are associated) have been identified as of particular interest. Such an exemplary application would be tracking only the dispersion of funds related to reported transactions or accounts (such as those which have been associated with fraudulent activity) through the network. In this case, if the source account of the outbound transaction is not associated with any previous dispersion tree, a trace request will not be produced. That is, a new tree_id will not be created, since the transaction between accounts is not a transaction of interest. In this manner, only dispersion of funds from accounts which have been indicated as accounts of interest will be traced through the network, reducing the total storage requirements of the network in order to trace the dispersion of funds through the network Inbound Transaction:

According to the present embodiment, the trace request (or information regarding the destination identifier and the dispersion tree identifier as described above) is produced in response to an outbound transaction (that is, a transaction initiated with the financial institution with which the device that generates the trace request is associated). As such, when the transaction is received at the financial institution which owns the bank account to which the transaction is being sent, that financial institution will also receive the trace request which was generated by the method according to FIG. 13 described above.

When a trace request is received, the method according to the present embodiment comprises storing an association between the account identifier and the dispersion tree contained in the trace request in the storage unit A of that financial institution. That is, when a trace request is received, the mapping between that account and dispersion tree is added to the mapping stored in the storage unit A. If that account is already associated with previous dispersion trees, then the new association is added to that previous association. In this manner, it will be appreciated that a given account may be identified as being associated with a plurality of dispersion trees. However, if that account is not already associated with any previous dispersion trees, then a new association will be created in the storage unit A.

In some examples according to the present embodiment, the receiving financial institution may store the identification of the received transaction in a storage unit. That is, a mapping between a unique identifier of the transaction, and the dispersion tree with which that transaction has been identified as belonging may be stored in a storage unit by the receiving financial institution or the device associated with that financial institution. However, as stated above, the storage of this identification could alternatively, or in addition, be stored by the financial institution or device linked to that financial institution from which the transaction was initiated.

In this manner, any further transactions which are sent from that account will also be associated with that previous dispersion tree.

Figure 14:
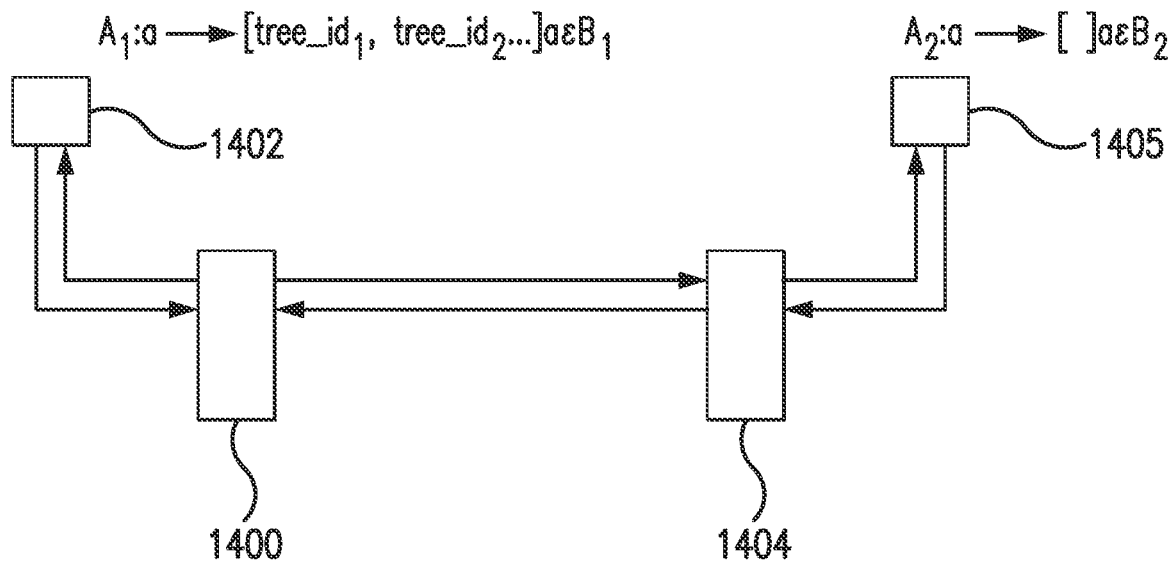
FIG. 14 illustrates an exemplary transaction between two financial institutions according to an embodiment of the disclosure.

Exemplary Transaction:

FIG. 14 illustrates an exemplary transaction between two financial institutions according to the present embodiment. In this example, a transaction is sent from a source bank account associated with financial institution 1400 to a destination bank account associated with financial institution 1404. In this example, the transaction relates to a transfer of funds from the source bank account to the destination bank account.

When the transaction is initiated, financial institution 1400 sends the outbound transaction information to the device 1402. As such, the device receives the outbound transaction information (that is, the transaction information related to the outbound transaction generated by financial institution 1400). Upon receiving the transaction information, the device then determines whether the source account identifier is associated with a previous dispersion tree.

That is, the device performs a single lookup in the storage unit $A_1$ in order to determine whether any mapping exists between the source account identifier a and any tree_id stored in the storage unit. It will be appreciated that the method or function used in order to determine whether any mapping exists between the source account identifier and any dispersion tree identifier stored in the storage unit is not particularly limited in this respect.

In this example illustrated in FIG. 14, it is determined that a mapping does exist. That is, the source account identifier a is mapped to a tree_id in the storage unit. Accordingly, device 1402 produces a trace request comprising the destination account identifier and the tree_id which has been retrieved from the storage unit $A_1$. This trace request is then sent across the network, directly or indirectly, to the financial institution 1404 with the transaction information. That is, the device 1402 can either first inform financial institution 1400 of the trace request, and financial institution 1400 send the trace request to financial institution 1404, or the device 1402 can send the trace request to financial institution 1404 directly.

At this time, the transaction between the source bank account and the destination bank account is identified as belonging to dispersion tree identified by tree_id. In this example, this identification is then stored at a storage unit associated with financial institution 1400, however, in other examples, this identification may be stored in a storage unit associated with financial institution 1404.

When financial institution 1404 receives the transaction information, the corresponding trace request is sent to the device 1406. At this stage, the device 1406 then adds the mapping between the account identifier of the destination account and tree_id to the storage unit $A_2$. As such, any further transactions which are sent from that account will be associated with the tree_id. In this respect, it will be appreciated that the exemplary transactions illustrated with respect to FIGS. 7A-D apply also to this present embodiment of the disclosure.

The method according to the present embodiment enables transactions to be traced through the network quickly and substantially in real time, while increasing the level of privacy and network security.

Moreover, owing to the method of tracing messages through a network of nodes according to the present embodiment, the requirement for a centralised database and device is removed. As such, even if a single node or nodes are unavailable (owing to system failure or the like) at least a portion of the dispersion tree relating to a transaction of interest can still be obtained.

Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

It will be appreciated that there is no particular limitation between the time when the financial institution 1400 informs the device 1402 of the transaction and the time of the transaction itself. The device 1400 may be provided with the message information before, concurrently or immediately after the transaction between financial institution 1400 and financial institution 1404 has been sent. That is, given that the method according to the present embodiment requires a single lookup in A in order to determine any tree_id associated with the source account identifier, the production of the trace request occurs on a timescale much shorter than that of the transaction between 1400 and 1404 itself. Accordingly, even if the device associated with financial institution 1400 is provided with the transaction information immediately after the transaction is sent, a trace request can still be produced and sent to 1404 before the transaction itself has been processed. Therefore, even in this case, the dispersion can be traced in quickly and substantially in real time.

Furthermore, it will be appreciated that the method according to the present embodiment does not substantially increase the network traffic required in order to trace the dispersion through the network in the distributed manner. That is, in the example whereby the trace request is included with the transaction information, the only additional information which need be transmitted between the financial institutions is the tree_id which has been associated with the source account. As such, the implementation costs and data sharing agreements required for tracing messages through a network of nodes is reduced.

Trace Initiation

As described above, with reference to FIG. 13, in some examples of the present embodiment, the method comprises tracing all dispersion through the network. That is, for every transaction which is initiated a corresponding trace request is produced; when the source identifier is associated with a previous dispersion tree, this previous dispersion tree is included in the trace request, whereas when the source identifier is not associated with a previous dispersion tree a new dispersion tree identifier is created and included in the trace request. However, in other examples of the present embodiment, the method comprises only tracing the dispersion of transactions and funds where an account has been identified as an account of interest. In this example, if a transaction is sent from an account which is not associated with a previous dispersion tree, then no trace request will be produced.

It will be appreciated that an account of interest could, for example, be an account that has been linked to fraudulent activity such as fraudulent transactions or the like. The fraudulent activity could be identified by any method, and is not particularly limited in this respect. However, once an account has been identified as an account of interest, all transactions which are made from that account will be associated with a dispersion tree relating to the dispersion of funds from that account.

Figure 15:
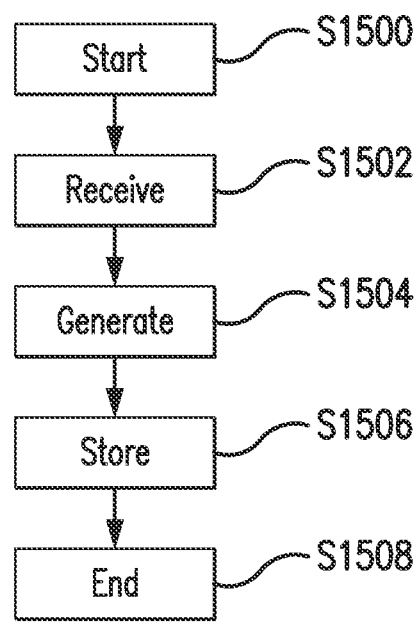
FIG. 15 illustrates a method of initiating a trace request according to an embodiment of the disclosure.

The initiation of the tracing of dispersion in response to an account being reported as fraudulent, or linked to fraudulent activity, according to the present embodiment is described with reference to FIG. 15, which illustrates a method of initiating a trace request according to the present embodiment of the disclosure. Step S1502 comprises receiving a trace initiation request, the trace initiation request comprising a second account identifier; Step S1504 comprises generating an identifier corresponding to a new set of messages and step S1506 comprises storing an association between the second account identifier and the new set of messages in the storage unit.

Method steps S1502 to S1506 will be described with reference to the example shown in FIG. 12 of the disclosure.

In this example, an account a is determined as being an account linked to fraudulent activity. In this example, this is determined by the financial institution 1202. Financial institution 1202 then reports that the account has been reported as fraudulent to the device 1204 in the form of a trace initiation request. The trace initiation request comprises a unique account identifier identifying the account which has been linked to the fraudulent activity. Upon receiving this account identifier the device 1204 according to the present embodiment subsequently generates an identifier corresponding to a new set of messages. That is, the method comprises generating a new tree_id with which to trace the dispersion of funds and transactions from that account.

The new tree_id may be generated in accordance with transaction information corresponding to the outbound transaction. For example, the new tree_id may be generated based upon a unique transaction identifier identifying the received transaction or the like.

Once the tree_id has been generated, the method then comprises storing an association between the reported account identifier from the trace initiation request with the tree_id linked to the new set of messages in the storage unit A linked to that financial institution. As such, any further transactions which are sent from that account will be associated as belonging to the same dispersion tree.

In this manner, a request can be made to trace the dispersion of funds from an account linked to suspicious or fraudulent activity. The dispersion from that account can then be traced quickly and substantially in real time in a distributed manner without the requirement for a central database according to the method of the present embodiment increasing the level of privacy and network security.

Application of a Timer:

According to the above described method, once an account has been identified as belonging to a given dispersion tree, any further transaction from that account will be identified as belonging to that dispersion tree also. As such, a transaction from that account which occurs even after an extended period of time, such as several weeks or months after, will be associated as also belonging to that dispersion tree. However, in the example relating to the dispersion of funds through a banking network, as described above, typically, the fraudster will utilise a transaction which allows money to be transferred between various bank accounts very quickly such as within a matter of seconds or minutes for example. Therefore, in this situation, transactions which occur after a predetermined time has expired are not likely connected to the same dispersal of fraudulent funds through a network.

In accordance with the present embodiment, the method may further comprise setting a first timer which will remove the association between the first account identifier and the set of messages after a predetermined time. That is, according to the example illustrated in FIG. 14, when the trace request is received by financial institution 1404, and the mapping between the account identifier and tree_id in the trace request is created, then a timer is set which will remove the association between that account identifier and tree_id after a predetermined time has expired.

In certain examples, the timer which will remove the association between the account and the dispersion tree may be set to any value in period is between 24 and 148 hours.

This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours for example.

Accordingly, if further transactions are sent from that account after the predetermined time has elapsed, then those transactions will not be associated with the dispersion tree identified by tree_id. Rather, in the case of tracing all dispersion, a new dispersion tree and tree_id will be created and associated with that account.

Each mapping in A between an account identifier a and a dispersion tree identifier tree_id may be associated with its own timer. Furthermore, if a further trace request is received comprising the account identifier a and the dispersion tree identifier tree_id before the timer associated with that mapping has expired, then the timer associated with that mapping will be reset. As such, further transactions from that account will continue to be linked with that dispersion tree, since that account is still active within the dispersion tree.

When the timer expires, and the association between tree_id and a is removed, if it is determined that no further dispersion trees are associated with a in the storage unit A for that device, then a will also be removed from that storage unit. Use of the timer in this manner reduces the storage space required to trace messages through a network of nodes according to the present embodiment. It will be appreciated that storage of the identification between the transaction and the dispersion tree remains in the storage unit, such that the transactions associated with a given dispersion tree or set of previous transactions may be identified at a later stage as required.

Furthermore, using a timer to remove the association between the account and dispersion tree according to the present embodiment further improves the ability to track fraudulent transactions through a banking network quickly and substantially in real time, since only transactions which occur within a statistically significant period will be identified as belonging to the same dispersion tree.

Information Request:

The method according to the present embodiment of the disclosure enables the transactions or messages between a network of nodes to be traced quickly and substantially in real time without the need for a central node or database. That is, in the example of tracing all dispersion, each financial institution, or device linked to that financial institution, constructs and stores a portion of the total dispersion tree of the network of nodes. Referring to FIG. 12, for example, where a stream of transactions are sent and received between the financial institutions of the network. Device 1208 stores a mapping in the storage unit between accounts and dispersion trees in A only for those accounts which belong to the corresponding financial institution 1206. Furthermore, the identification of transactions as belonging to a given dispersion tree by device 1208 is only stored for transactions which are sent or received by the corresponding financial institution 1208.

At some time t into the stream of transactions, a transaction may be identified as being a fraudulent transaction, or be linked to some suspicious or fraudulent activity in some respect. At this stage, it is necessary to rapidly identify the dispersal of the funds from the fraudulent activity through the banking network, such that those accounts which are linked with the fraudulent activity can be identified and closed, for example, preventing the fraudsters from preforming any more transactions from that account.

Consider, for example, that financial institution 1202 determines that an account a has been linked with fraudulent activity, and wishes to determine all the transactions which are associated with that account. Financial institution 1202 can only retrieve from device 1204 the subset of those transactions which have been sent or received by the financial institution 1202, and can not ascertain all those accounts or transactions in the wider network which may be associated with that transaction by virtue of belonging to the same dispersion tree identified by a unique tree_id.

As such, at this stage, the method according to the device associated with that financial institution transmits an information request across the network. In this example of the present embodiment, the information request comprises the unique tree_id which the reported account has been identified as being associated with. It will be appreciated that where that account is associated with a plurality of dispersion tree identifiers in the storage associated with financial institution 1202, the information request will comprise the plurality of dispersion tree identifiers instead of the single tree_id.

Once an information request has been received, by device 1208 for example, then the method according to the present embodiment comprises producing a list of the account identifiers associated with that dispersion tree identifier in the storage unit. This list of accounts will then be reported back to the device 1204 of the financial institution 1202 which made the initiation request. Alternatively, or in addition, upon receiving the information request, the method according to the present embodiment may comprise producing a list of those transactions associated with the dispersion tree identifier in the received information request which are held by that financial institution or corresponding device, and returning that list to the device 1204 or the financial institution 1202 which made the initiation request.

It will be appreciated that the information request may comprise a unique account identifier of the account which has been reported as fraudulent. In this case, the unique account identifier is used to retrieve any related accounts or transactions from the financial institutions in the network Each device (1202, 1208, 1212) in the network receives the information request, and by producing a list of the associated accounts or transactions as according to the present embodiment, it is possible to construct the full dispersion tree for account throughout the network. That is, all those accounts or transactions which are associated with the fraudulent account or transaction can be rapidly identified.

That is, because the dispersion of funds through the network has been constructed quickly and substantially in real time using the method according to the present embodiment, when a transaction has been reported as fraudulent no further calculations are required in order to trace the dispersion of funds through the network. Rather, the connected transactions can simply be retrieved through a small number of lookups performed by each financial institution or associated device. Typically, owing to the limited number of lookups required in response to a fraudulent transaction being reported, the identification of the linked transactions can be performed in a matter of milliseconds. As such those accounts linked with the fraudulent transaction can be rapidly closed or deactivated in order to frustrate the fraudster from performing any further fraudulent transactions.

It will be appreciated that the level of disclosure which each financial institution wishes to provide in response to an information request can be determined by each financial institution, and this may vary in accordance with the entity which makes the information request. For example, if the information request originates from an institution with which the device receiving the information request has a high level of trust, then the device may provide additional transaction data with the list of linked accounts or transactions which further assist in the analysis of the fraudulent activity. In contrast, if there exists only a low level of trust, then only the minimum information need be provided. In other words, the distributed topology and network structure which are possible owing to the method of the present embodiment provide a graduated level of access permission enhancing the level of privacy and control afforded to each financial institution, or node, in the network.

Furthermore, the method according to the present embodiment can be provided in a decentralised manner, without the requirement of a centralised database. As such, even if a single node or nodes are unavailable (owing to system failure or the like) at least a portion of the dispersion tree relating to a transaction of interest can still be obtained. Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

Additional Modifications of the Embodiment

While the present embodiment has been described with examples relating to fraudulent transactions throughout the network, it will be appreciated that the method according to the present embodiment is not so limited in this respect. That is, the messages according to the present embodiment could relate to any type of financial transaction between bank accounts or financial institutions made by any method such as Faster Payments, BACS transfers or the like. Alternatively, the method according to the present embodiment could be used to construct a set of traceable messages with relation to any message or transaction, and is not so limited to financial transactions. For example, the method according to the present embodiment could be applied to building a set of traceable messages through a mobile communications network or the like.

Tracing Dispersion Across Networks:

As noted above, it is often desirable to trace the connections, formed by events, such as an exchange of messages, which occur between entities in a network as quickly as possible. This enables rapid identification of those entities in a network that are connected to a first entity, or a prior event, of particular interest. Furthermore, it is desirable that these connections can be rapidly identified even when the respective entities are located within different communication networks and/or when a number of different types of interactions or events occur between those respective entities.

Accordingly, a method of storing a set of events is provided by the present embodiment of the disclosure. This method may be applied to situations such as the tracing of dispersion of funds between entities located in, and across, different payment systems. These payment systems may be located in the same territory, or alternatively, across different territories (such as a Faster Payment Service payment between a first entity in Europe and a second entity in America, for example). Accordingly, the present embodiment will be described with reference to this example situation. However, it will be appreciated that the present embodiment of the disclosure is not intended to be particularly limited in this respect, and may alternatively be applied to alternative example situations comprising the exchange of electronic messages, such as emails or text messages, between entities in a communications network.

Example Situation

Figure 16:
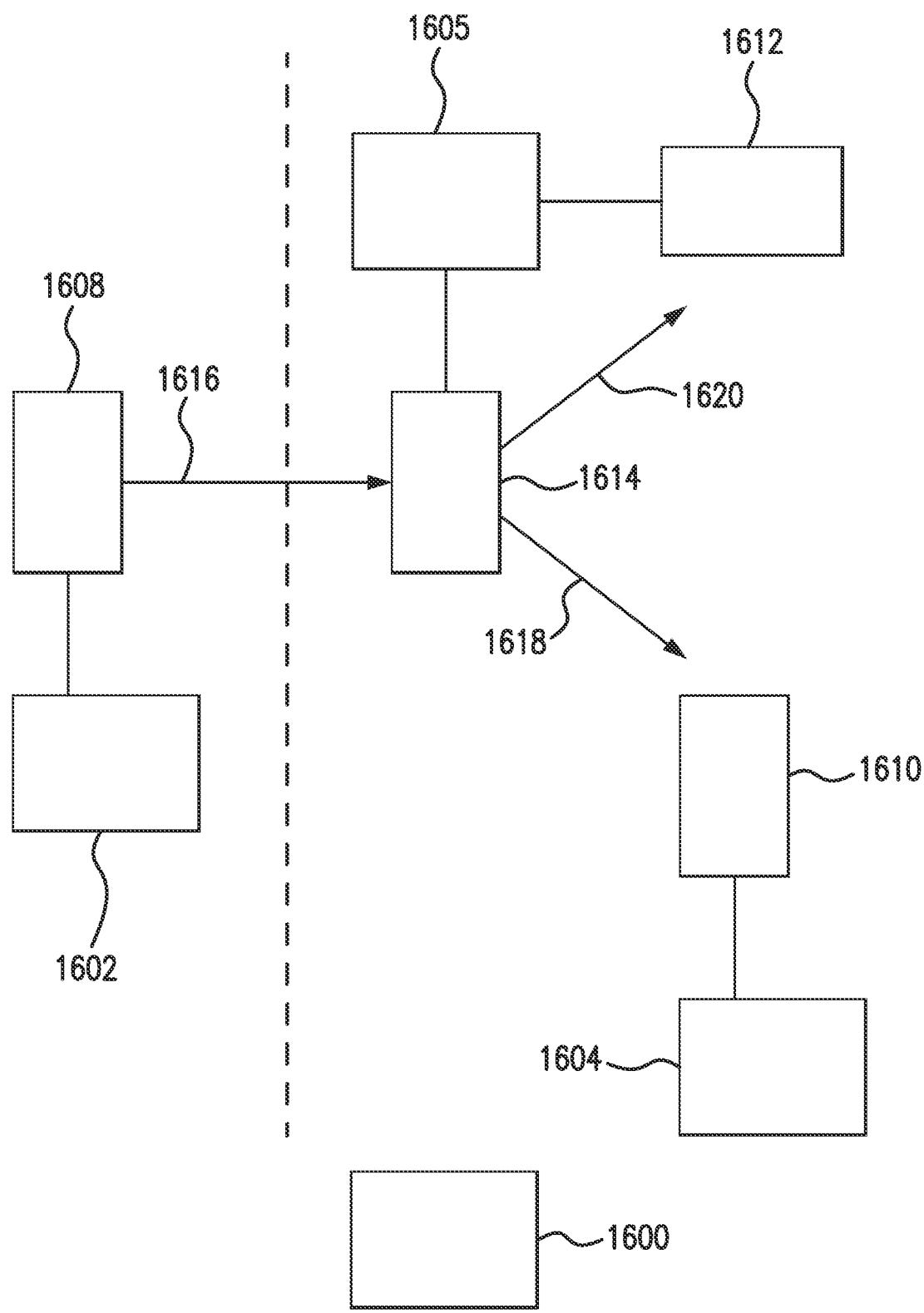
FIG. 16 illustrates an example situation to which examples of the disclosure may be applied.

FIG. 16 illustrates an example situation to which examples of the present disclosure may be applied.

In this example situation, apparatus 1600 is an apparatus for storing a set of events according to the present embodiment of the disclosure. Apparatus 1600 may be an apparatus such as apparatus 100 described with reference to FIG. 1 of the present disclosure, which is configured for storing a set of events in accordance with the present embodiment. In particular, it will be appreciated that apparatus 1600 comprises a first circuitry which is configured to receive/transmit electronic messages across a communications network. This first circuitry may comprise a network connection element such as network connection 115 of apparatus 100 as described with reference to FIG. 1 of the present disclosure. It will further be appreciated that apparatus 1600 comprises a second circuitry which is configured to perform certain processing operations in accordance with the present embodiment. This second circuitry may comprise processor circuitry 110 of apparatus 100 as described with reference to FIG. 1 of the present disclosure. The specific operations of apparatus 1600 in this example situation will be described in more detail below.

In this example situation, a first financial institution 1602 is provided in a first payment network. Likewise, a second and third financial institution 1604 and 1606 are provided in a second payment network. In this example situation, each or any of the first, second and third financial institution may be a banking organisation, other financial institution, or the like.

The first financial institution 1602, located in the first payment network, may communicate with the second and third financial institutions 1604 and 1606 located in the second payment network. However, unlike the communications between the second and third financial institutions 1604 and 1606 which are located within the same payment network (that is, the second payment network), it will be appreciated that communications between the first financial institution 1602 (located in the first payment network) and the second or third financial institutions 1604 and 1606 (located in the second payment network) may be subject to additional technical limitations or restrictions. This may be, for example, due to inherent technical incompatibilities between the two payment networks. Alternatively, this may be due to certain restrictions which limit the transfer of funds across payment networks.

Each of the financial institutions 1602, 1604 and 1606 has one or more accounts which are linked to that financial institution. In this example, financial institution 1602 is linked to account 1608, financial institution 1604 is linked to account 1610 and financial institution 1606 is linked to accounts 1612 and 1614. That is, accounts 1608, 1610, 1612 and 1614 are accounts, such as bank accounts, which are associated with the respective financial institutions. Each of these accounts may be identified by a unique identifier such as a bank account number, sort code or IBAN code. These accounts may belong to companies or, alternatively, to private individuals and may be used in order to store monetary funds with the respective financial institution with which the account is associated. It will be appreciated that many other bank accounts (not shown) may be associated with the financial institutions 1604, 1606, 1608 and that the present disclosure is not particularly limited in this regard.

In this example situation, the owner of account 1608 instructs a transaction 1616 to be processed in order to transfer funds from the account 1608 to account 1614. This may be instructed via the Faster Payments Service (FPS) payment system, Bankers' Automated Clearing Service (BACS) payment system, Clearing House Automated Payment System (CHAPS), Society for Worldwide Interbank Financial Telecommunications (SWIFT) payment system or the like. In this manner, account 1614 (located in the second payment network) receives funds from account 1608 (located in the first payment network).

Now, it will be appreciated that, as illustrated in FIG. 16 of the present disclosure, apparatus 1600 is located in the second payment network and is configured to trace the dispersion of funds between respective accounts and financial institutions within the second payment network. That is, apparatus 1600 consumes every transaction which occurs within the second payment system; a record of each transaction is stored, and tracing of the dispersion of funds between the accounts within the second network will be performed when an initial transaction within that second network has been identified as a transaction of interest.

Tracing of the dispersion of funds in this second payment network may be performed through the method described with reference to FIG. 13 of the present disclosure, for example.

In an economy such as the UK (which, in some examples, could be considered to represent the second payment network in FIG. 16), the number of transactions between accounts could reach a rate of around 300 transactions per second. As such, it will be appreciated that there may be a large number of transactions received from external payment networks (that is, transactions originating outside the UK).

However, because apparatus 1600 is located in the second payment network, it is unable to trace the dispersion of funds occurring in the first payment network. That is, it is difficult to trace the dispersion of funds through the second payment network when the initial event of interest (the seed transaction), such as a potentially fraudulent transaction, occurs outside the second payment network.

Furthermore, even within a payment network, it can be difficult to trace the dispersion of funds when the transfer of those funds is achieved using different payment systems. Consider, for example, that, once the owner of account 1614 has received funds from account 1608 (using a first payment system such as BACS) the owner of the account 1614 initiates further payments 1618 and 1620 from account 1614 to accounts 1610 and 1612 respectively, where these further payments are initiated using an alternative payment system (such as the FPS payment system, for example). Because these payments are conducted using different payment systems (the BACS and FPS payment systems in this example) it can be computationally challenging for the apparatus 1600 to trace the dispersion of funds between the accounts.

Accordingly, it will be appreciated that the transfer of funds across payment networks and/or using different payment systems enables parties to perform a rapid transfer of funds which are difficult to trace. This may be exploited by fraudulent entities for the purposes of money laundering. Initially, fraudulent funds (being funds obtained by illegal or illicit activity) may be transferred across payment networks and/or payment systems (such as from account 1608 to 1614). Then, the process of transferring the money away within the second payment network then continues, possibly for many generations of bank accounts (such as to accounts 1610 and 1612 in the example of FIG. 16). The purpose of the distribution and dispersion of the money to various bank accounts within the second payment network is so that, at a final step, the terminating bank accounts (usually having smaller quantities of cash) may be used in order to extract funds using an Automatic Teller Machine (ATM) or, alternatively, may be used to purchase goods from a shop without arousing suspicion.

FIG. 17 illustrates an example method which may be performed by apparatus 1600 in accordance with the present embodiment of the disclosure. This method enables apparatus 1600 to rapidly trace the dispersion of funds across a network, even when the initial transaction occurs outside the payment network in which apparatus 1600 is located. This method may be applied to the example situation of FIG. 16 of the present disclosure, for example.

The method starts in step S1700, and proceeds to step S1702.

In step S1702, the apparatus receives an electronic message identifying a payment or transaction. This message may be a trace request, for example, such as that described with reference to FIG. 12 of the present disclosure. That is, apparatus 1600 may receive a notification that a certain transaction is suspicious and potentially fraudulent in nature. This request may be received from one or more of the financial institutions which are associated with the accounts which have engaged in the potentially fraudulent activity.

In the example of FIG. 16, if it is considered that the transaction 1616 between account 1608 and 1614 is suspicious and potentially fraudulent in nature, then at least one of financial institutions 1602 and 1608 may send a notification to apparatus 1600. This notification will inform apparatus 1600 that a potentially fraudulent transaction has occurred. This notification may comprise specific identification of the suspicious transaction 1616 (being an exchange of funds between accounts 1608 and 1614), such as a unique identifier of the transaction.

It will be appreciated that the manner in which the financial institutions identify a transaction as a potentially fraudulent transaction is not particularly limited. That is, the method of said initial identification by the financial institutions of a fraudulent, or potentially fraudulent, transaction will depend upon the situation. A transaction may be identified as suspicious based upon a statistical analysis of the activity of the account and/or certain attributes of the individual transaction (such as the payment amount, for example).

In this manner, a request can be made to apparatus 1600 trace the dispersion of funds from an account, or accounts, linked to suspicious or fraudulent activity.

When this electronic message (or notification) is received, apparatus 1600 performs a check to determine whether the payment is a payment which exists within a first storage unit to which apparatus 1600 is communicatively coupled. The first storage unit comprises a record of each transaction which has occurred within the second payment network (that is, the payment network in which the apparatus 1600 is located). In some examples, apparatus 1600 may itself add a record to the first storage unit for each transaction which occurs. In other examples, one or other of the financial institutions which are associated with the accounts engaged in a transaction may add a record of the transaction to the first storage unit. Regardless, in either situation, the first storage unit comprises a complete record of the transactions which have occurred within that payment network (the second payment network).

Accordingly, when apparatus 1600 is notified of a potentially fraudulent transaction, by determining whether or not a record of that transaction exists within the first storage unit, the apparatus 1600 can determine whether or not that transaction occurred within the second payment network (being the network within which apparatus 1600 is located).

If a record of the transaction exists, then apparatus 1600 can determine that it is a transaction which has been "seen" (being a transaction which occurs within the payment network apparatus 1600 is located in, or which has occurred via the payment system which apparatus 1600 is monitoring). In this case, the method flow proceeds directly to step S1708 and apparatus 1600 builds a trace of the dispersion of the funds from that transaction through the payments network (using the method described with reference to FIG. 13 of the present disclosure, for example).

That is, once a transaction (or an account) has been identified as a transaction of interest, and it is determined that that transaction has been "seen" (that is, a record of the transaction exists within the first storage unit) all subsequent transactions which are made from an account associated with that transaction of interest will be traced with a dispersion tree relating to the dispersion of funds from that account. This enables the rapid and efficient identification of transactions and accounts related to a transaction or account which has been reported as being linked with fraudulent activity.

However if, in step S1702, apparatus 1600 determines that no record of the reported transaction exists in the first storage unit, then apparatus 1600 can determine that the transaction occurred wholly or partially externally to the payment network in which apparatus 1600 is located (or occurred via a payment system not monitored by apparatus 1600). In the example situation of FIG. 16, this may correspond to transaction 1616 between account 1608 and 1614. That is, because the transaction originated externally to the payment network in which apparatus 1600 is located, no record of the transaction exists in the storage unit. Accordingly, whilst it is known that this transaction may be potentially fraudulent in nature (from the electronic message or notification), it can be difficult to trace the dispersion of funds through the second payment network following this initial "seed" transaction located in the first payment network.

Accordingly, in the present embodiment, when it is determined that no record of the reported transaction exists in the first storage unit, the method proceeds to step S1704.

In step S1704, the apparatus determines the beneficiary of the potentially fraudulent transaction (that is, the beneficiary of the transaction which has been reported as potentially fraudulent in nature). Even though the reported transaction originated outside the payment network monitored by apparatus 1600, the beneficiary of that transaction (account 1614 in the example of FIG. 16) is located within the payment network monitored by apparatus 1600 (the first payment network). Accordingly, identification of the beneficiary of the reported transaction can be used in order to trace any subsequent dispersal of funds through the second payment network.

The beneficiary of the transaction can be identified through use of the bank account and sort code of the account which received the funds through the potentially fraudulent transaction. However, the present embodiment is not particularly limited in this regard. That is, identification of the beneficiary could also be achieved through any unique identifier associated with that account. For example, a unique device identifier (such as an identifier of a mobile computing device which has been used to access that account) or an email address associated with the beneficiary account could also be used to identify the beneficiary. In this manner, the beneficiary account (being the actual account which received funds during the transaction 1616) and any other account associated with that beneficiary account (being identified by the fact that they are associated with the same email address as the actual beneficiary account or are accessed by a device with the same device identifier as used to access the beneficiary account, for example) can be identified.

In an example, the user of a device (such as a mobile telephone) could be identified as the beneficiary of the transaction. Specifically, if a user uses a mobile telephone to access a first account which has been considered to be involved in a fraudulent (or potentially fraudulent) transaction then any other account which is accessed by that user on that device can also be considered to be a beneficiary account of the fraudulent transaction.

In other words, the account which received the funds in the potentially fraudulent transaction and any other account associated with that account (being linked by virtue of a shared identifier, such as being registered to the same person, accessed by the same device or linked to the same email) are identified by apparatus 1600. This identification is made because a subsequent transaction from any account linked with the beneficiary of the potentially fraudulent transaction may also be potentially fraudulent nature and relate to the dispersion of those fraudulent funds through the network.

Once the beneficiary account (or accounts) have been identified, the apparatus 1600 will determine whether there are, or have been, any outbound payments or transactions from that account within a predetermined time of the reported transaction (that is, the original potentially fraudulent transaction 1616).

In the example of FIG. 16, only a single beneficiary account is identified by apparatus 1600 (namely, account 1614). As such, apparatus 1600 will determine whether there are, or have been, any outbound transactions initiated by account 1614 within a predetermined time of the potentially fraudulent transaction 1616.

Subsequent tracing of dispersal of funds from account 1614 may be time limited so that only transactions occurring within a period of time from the funds arriving in the account are traced. Examples of this time period include any period between 24 hours and 148 hours. This period is statistically significant because this identifies the typically rapid diffusion of fraudulent transactions whilst ignoring the natural flow of non-fraudulent transactions (such as utility bill payments or the like) through the network. However, the present disclosure is not particularly limited in this regard, and any appropriate time period may be used in accordance with the situation to which examples of the disclosure are applied. That is, periods both longer and shorter than this range are envisaged.

In other words, if there are any outbound transactions from the beneficiary of the fraudulent transaction within the predetermined time of the initial potentially fraudulent transaction, a dispersion tree (that is, a fraudulent dispersal of the funds through the network) is possible. Accordingly, the method of the present embodiment of the disclosure proceeds to step S1708 and the dispersal of funds through the second network (being the payment network in which the apparatus 1600 is located) will be traced.

As such, even in the case whereby the initial transaction of interest originated outside the payment network in which the apparatus 1600 is located (or whereby the initial transaction is achieved by a payment system which the apparatus 1600 is not actively monitoring) the subsequent fraudulent dispersal of funds through the payment network in which the apparatus 1600 is located can be rapidly identified.

The present embodiment may therefore be applied to example situations in order to trace funds within UK payment networks where the original payment may have originated from a foreign country or a non-native payment system. Moreover, the present embodiment may be applied to example situations in order to trace dispersal of funds whereby the funds have originated through a system such as cheques, BACS or SWIFT and where funds are subsequently rapidly dispersed through a second payment network using the FPS system.

Returning to FIG. 17, it is noted that an optional step S1706 may also be performed by apparatus 1600 in accordance with the present embodiment of the disclosure. In step S1706, the apparatus verifies whether the submitter or requestor has necessary attributes or permissions in order to perform a trace request for the transaction. That is, one or more attributes of the requesting party (being the party who notified apparatus 1600 of the potentially fraudulent transaction) are verified by apparatus 1600 prior to building a dispersion tree of the dispersal of funds through the second payment network. This may comprise verifying at least one of the identity of the requesting party and/or the authorisation of that party to perform said request. Verifying the permissions may comprise a comparison of the identity of the requesting party (once verified) to a storage or database of permissions and restrictions associated with that party, for example.

By means of an example, consider an exchange or transaction between a first account which is registered with a first financial institution (such as Lloyds Bank) and a second account which is registered with a second financial institution (such as NatWest Bank). In this case, a third financial institution (such as Nationwide) could not make a request to trace the transaction, since neither of the accounts involved in the fraudulent (or potentially fraudulent) transaction are related to the third financial institution.

Once the dispersal of funds through the network (the set of events) has been stored, those accounts which are associated with the initial event of interest may be rapidly identified. This allows financial institutions to be notified of accounts which are used in fraudulent and scamming activity, such that the money can be stopped from leaving those accounts and, eventually, these accounts can be closed.

Figure 18A:
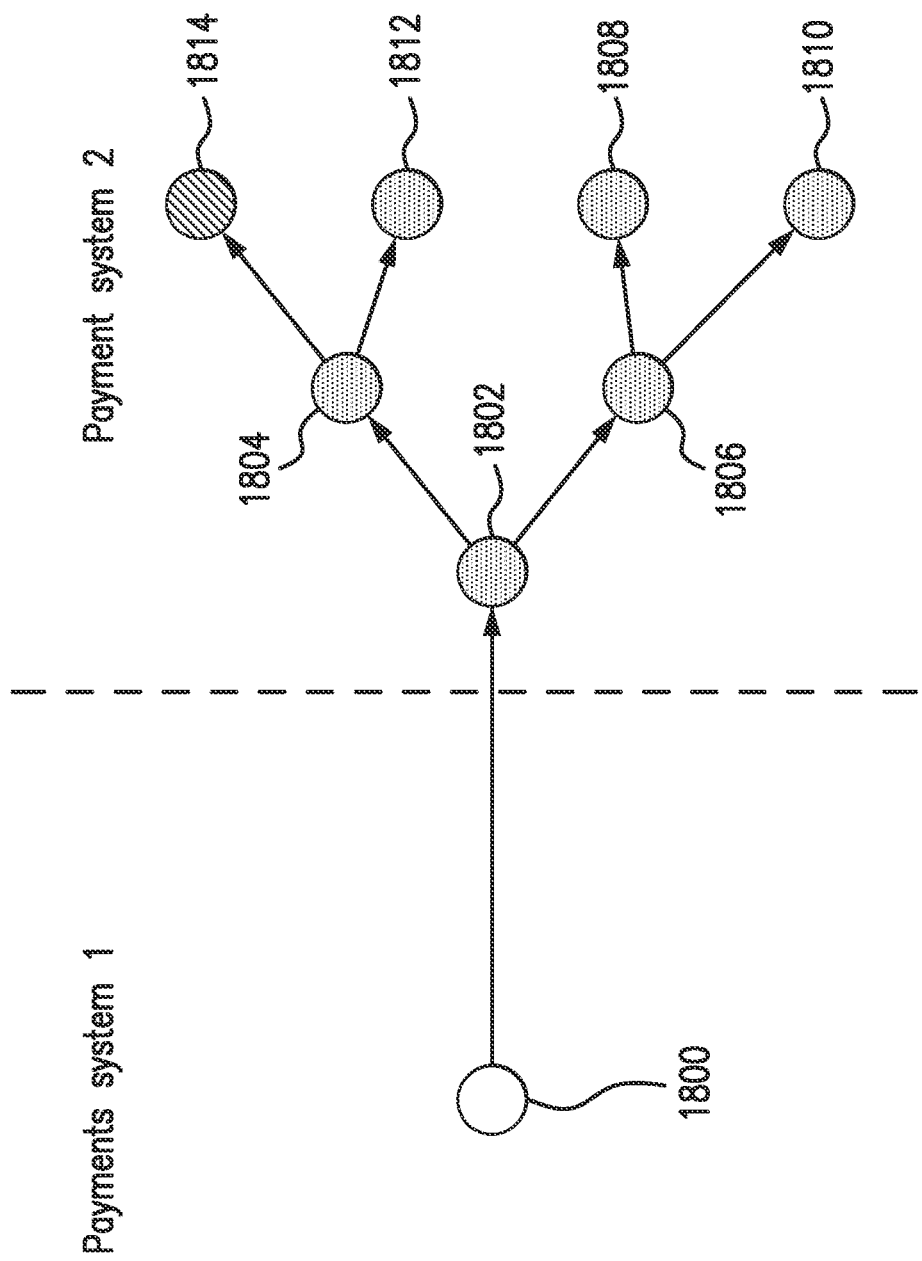
FIG. 18A illustrates an example set of events which may be stored in accordance with examples of the disclosure.

FIG. 18A illustrates an example set of events which may be stored in accordance with examples of the disclosure. In this example situation, account 1800 is located in a first payment network, while accounts 1802 to 1814 are accounts which are located in a second payment network. An apparatus, such as apparatus 1600, monitors transactions which occur within the second payments network. The set of events, in this example, is the transactions which are used to transfer and disperse funds across the second payments network.

In this example, a first transaction between account 1800 (located in the first payment network) and account 1802 (located in the second payment network) is reported as a potentially fraudulent transaction. Because account 1800 is located outside the second payment network (being the payment network in which an apparatus 1600 is located) the transaction between account 1800 and account 1802 is an "unseen" transaction, and the dispersal of funds prior to their reception by account 1802 is not traced by apparatus 1600.

However, according to the present embodiment of the disclosure, once the transaction between account 1800 and account 1802 has been reported as fraudulent, any subsequent outbound transaction from the beneficiary of that transaction within a predetermined time of the transaction between account 1800 and 1802 within the second payment network will be treated as, potentially, part of the fraudulent dispersal of funds.

In this example situation, only account 1802 is identified as being associated with the beneficiary of the transaction from account 1800 to account 1802. The present embodiment is not particularly limited in this respect, however.

Now, in this example, subsequent transactions occur between account 1802 and account 1804 and 1806 within a predetermined time of the original transaction between account 1800 and 1802. Accordingly, the dispersal of funds from account 1802 to 1804, and from account 1802 to account 1806, is traced through the second payment network.

Then, in this example, a further subsequent transaction occurs from account 1804 to 1812 within a predetermined time of the transaction between account 1802 and 1804. As such, this further subsequent transaction is also treated as being related to the fraudulent dispersal of funds through the second payment network. In contrast, a further transaction occurs between account 1804 and 1814, but occurs at a time which exceeds the predetermined time after the transactions between account 1802 and 1804. That is, it occurs at a time later than the predetermined time after the transaction between account 1802 and 1804. Accordingly, this transaction is not treated as being related to the fraudulent dispersal of funds through the network.

Likewise, further transactions from account 1806 to 1808 and 1810 are also traced through the second network when they occur within a predetermined time of the transaction between account 1802 and 1806.

As such, even when the initial transaction of interest (the "seed" transaction) originated outside the payments network in which the apparatus 1600 is located the dispersal of funds through the network can be determined more quickly, and is substantially in real time, enabling rapid identification of transactions and accounts related to a transaction or account which has been reported as being linked with fraudulent activity.

Figure 18B:
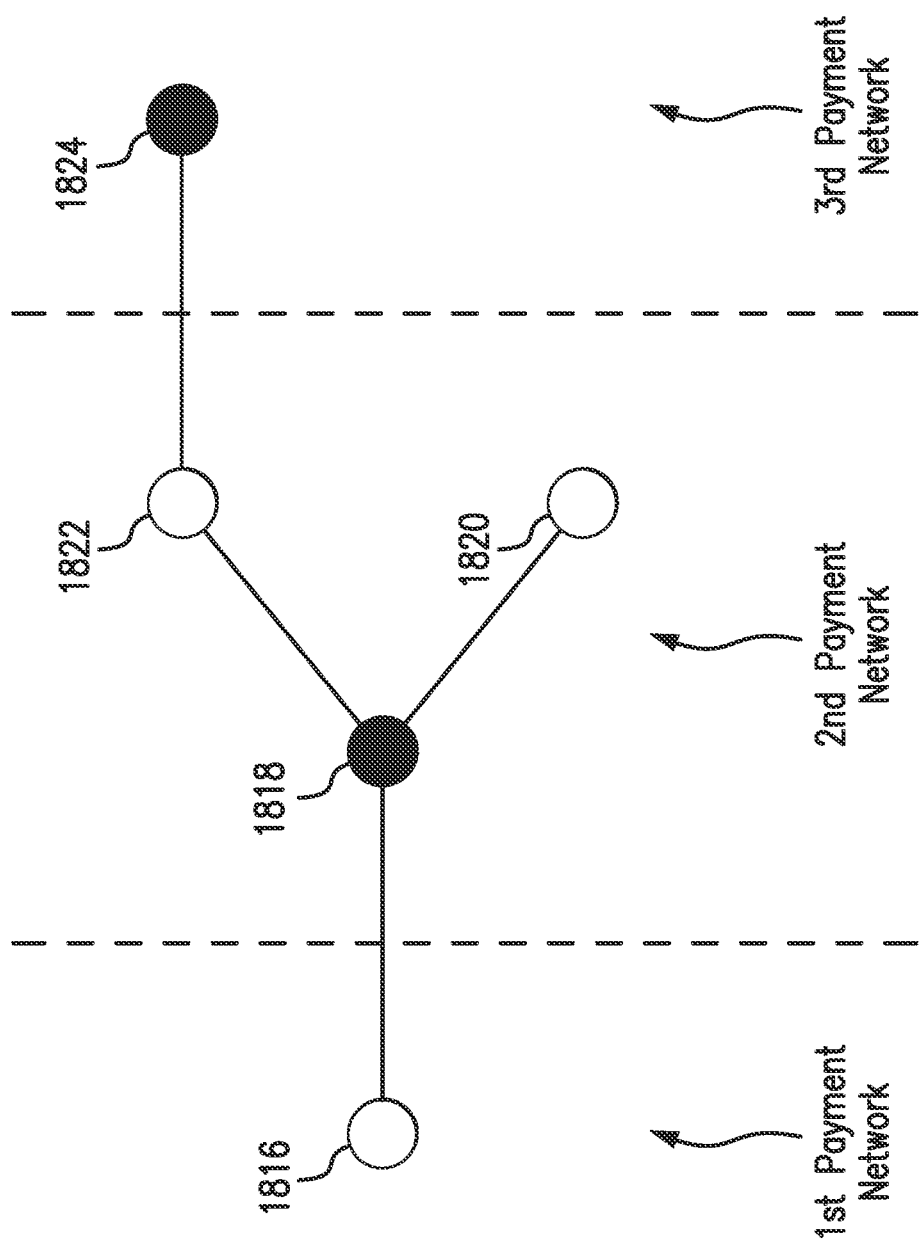
FIG. 18B illustrates an example set of events which may be stored in accordance with examples of the disclosure.

Furthermore, while the example situation illustrated with reference to FIG. 18A of the present disclosure involves tracing the dispersion of funds between accounts located in a first and second payment network, it will be appreciated that the present disclosure is not particularly limited to the number of networks illustrated in this example. For example, examples of the disclosure may be applied to situations where funds are exchanged across more than two payment networks. Such a situation is illustrated with reference to FIG. 18B of the present disclosure.

In the example, account 1816 is located in a first payment network, while accounts 1818, 1820 and 1822 are located in a second payment network. Additionally, account 1824 is located within a third payments network.

In this example, a first payment is initiated between account 1816 (in the first payment network) and account 1818 (in the second payments network). This transaction is reported as a potentially fraudulent transaction. However, because account 1816 is located outside the second payment network, an apparatus 1600 located in the second payments network is unable to "see" the transaction. That is, the dispersal of funds prior to the reception of those funds by account 1818 is not traced by apparatus 1600 (located in the second payments network).

However, according to examples of the disclosure, once the transaction between account 1816 and 1818 has been reported as fraudulent, the subsequent dispersal of funds within the second payments network will be treated as part of the potentially fraudulent dispersal of funds. As such, apparatus 1600 (located in the second payments network) will trace any transaction, originating from account 1818, within the second network which occurs within a predetermined time of the transaction between 1816 and 1818. In this example, these subsequent transactions which are traced by apparatus 1600 (located in the second payments network) include transactions between account 1818 and accounts 1820 and 1822 respectively.

Then, in this example, a further transaction between account 1822 (located in the second payments network) and account 1824 (located in a third payments network) occurs. Because the transaction relates to the dispersal of funds outside the second payments network, apparatus 1600 (located in the second payments network) cannot monitor the subsequent dispersal of funds following this transaction (that is, it cannot monitor the subsequent dispersal of funds through the third payments network).

However, according examples of the present disclosure, apparatus 1600 (located in the second payments network) reports the transaction (between accounts 1822 and 1824) as being part of a potentially fraudulent dispersal of funds.

A second apparatus 1600 (located in the third payments network) is unable to "see" the dispersal of funds prior to their arrival in account 1824 (because the dispersal of those funds occurred within the second payments network). However, because apparatus 1600 (located in the second payments network) has reported the transaction between accounts 1822 and 1824 as being related to the potentially fraudulent dispersal of funds through the network, the second apparatus 1600 (located in the third payments network) will proceed to trace any further dispersal of funds which occurs from account 1824 within the third payments network within a predetermined time of the transaction between accounts 1822 and 1824.

In this manner, the fraudulent dispersal of funds can be traced across a plurality of payment networks.

In some example situations, the third payments network may actually be the first payments network. That is, funds may be traced as they are transferred from the first payments network to the second payments network, and then back to the first payments network. In other examples, there may be significantly more payments networks involved in the fraudulent transfer of funds.

Moreover, in some examples, each apparatus 1600 (being the apparatus which monitors the dispersal of funds through a single network) may report the dispersal of funds it has recorded to a central database. That is, in the example of FIG. 18B, apparatus 1600 (located in the second payments network) and apparatus 1600 (located in the third payments network) may each report the record of the dispersal of funds within their respective network to a central database. In this manner, a complete record of the dispersal of funds across the networks can be obtained.

While the example of FIG. 17 has been described with reference to an example whereby account 1800 is located outside the payment network in which apparatus 1600 is located, the present embodiment of the disclosure could also be applied to a situation whereby the transaction between account 1800 and 1802 occurs by virtue of a first payment system (such as via cheque, BACS transfer or SWIFT payment) while the subsequent transaction between accounts 1802 to 1814 occur via a second payment system (such as the FPS system).

As such, even when the initial transaction originated via a first payment system outside the payments system which the apparatus 1600 actively monitors, the subsequent dispersal of funds through a second payment system, or any number of subsequent payment systems, monitored by an apparatus 1600 can be determined more quickly, and is substantially in real time, enabling rapid identification of transactions and accounts related to a transaction or account which has been reported as being linked with fraudulent activity.

Method of Storing Set of Events:

While the present embodiment has been described with reference to an example situation of tracing the dispersal of fraudulent funds across payment networks and payment systems, it will be appreciated that the present disclosure is not particularly limited in this regard. That is, examples of the disclosure may be applied to any interaction or exchange between entities located in different networks (such as the exchange of electronic messages between a first communication device in a first communication network and subsequent communication devices in a second communication network). The first and second communication device may be a device such as apparatus 100 as described with reference to FIG. 1 of the present disclosure. In examples, the first and second communication devices may be portable communication devices such as a mobile telecommunications device or the like.

Hence, more generally, a method of storing a set of events is provided in accordance with the present embodiment of the disclosure.

Figure 19:
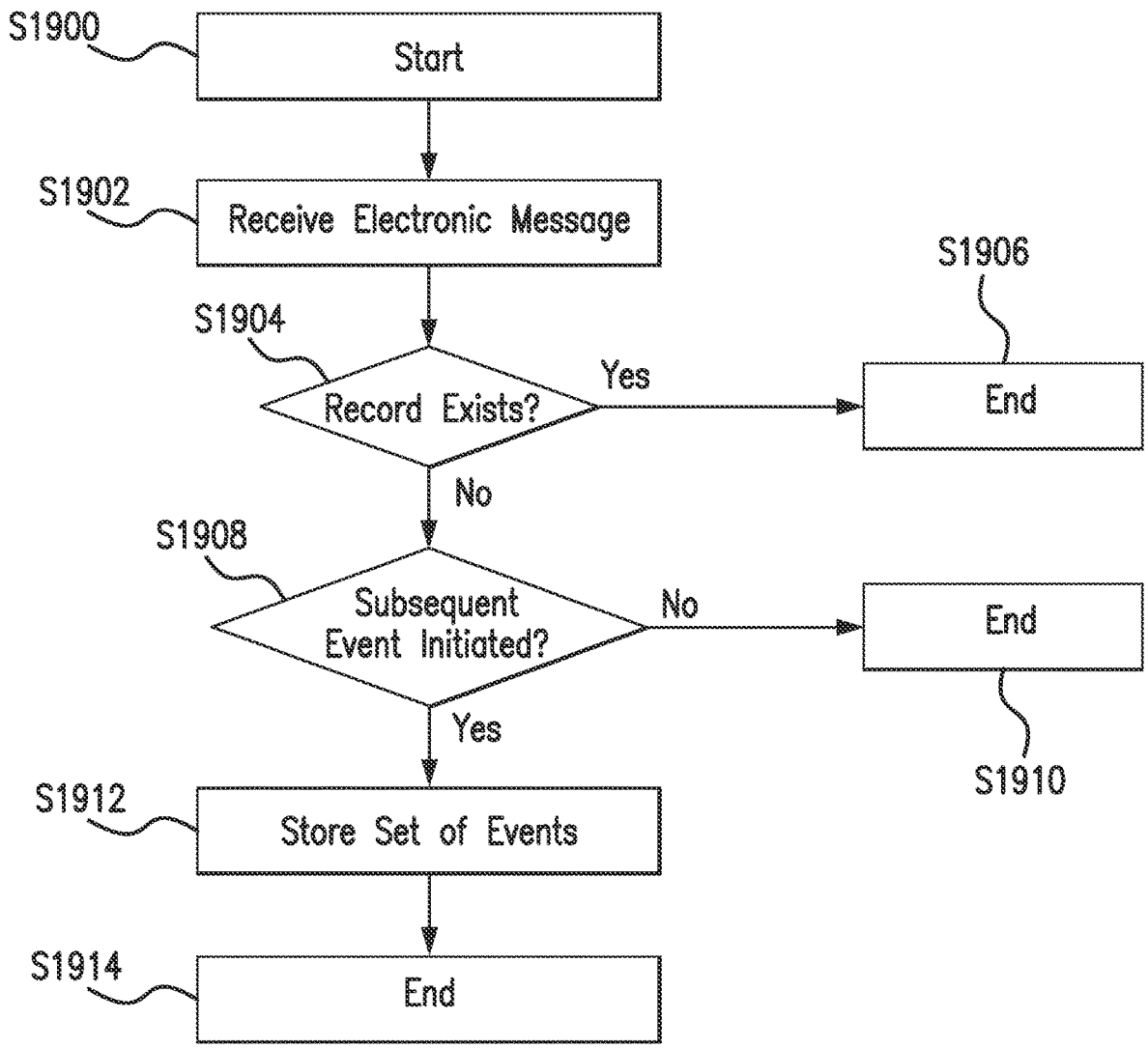
FIG. 19 illustrates a method of storing a set of events according to examples of the disclosure.

FIG. 19 illustrates a method of storing a set of events according to the present embodiment of the disclosure. This method may be performed by an apparatus such as apparatus 1600 described with reference to FIG. 16 of the present disclosure.

The method starts in step S1900 and proceeds to step S1902.

In step S1902, the method comprises receiving, by a first circuitry, an electronic message comprising information of a first event between a first party and a second party, the first event being initiated by the first party. The first circuitry could be a network connection 115 as described with reference to FIG. 1 of the present disclosure or could, alternatively, comprise any suitable transceiving circuitry configured to transceive an electronic message in accordance with the present embodiment.

In some examples, the electronic message may comprise information of an exchange between the first party and the second party. This could be information of an exchange of information (such as a message) or an exchange of funds or resources (such as a transaction), for example. That is, the event, of which information is contained in the message received by the apparatus 1600, could be any electronic exchange or interaction between the first and second party.

In the example whereby the electronic message comprises information of a transaction between the first and second party, the transaction may comprise a transaction including at least one transfer by cheque, an FPS transfer, a BACS transfer, a SWIFT transfer a CHAPS transfer or the like.

Now, in addition to the information regarding the event which has occurred between the first party and the second party, in some examples the electronic message may comprises a notification identifying the event as an event of interest. In a communications network, this may be a message which is considered to be either suspicious or malicious. Alternatively, in a financial system, the event may be one which is deemed fraudulent, or potentially fraudulent, in nature.

Once this electronic message has been received, the method proceeds to step S1904.

In step S1904, the method comprises determining, by a second circuitry, whether a record of the first event exists in a first storage unit. Here, it will be appreciated that the second circuitry could be processor circuitry such as processor circuitry 110 as described with reference to FIG. 1 of the present disclosure. However, alternatively, the second processor could be any circuitry such as a central processing unit (CPU) or the like. Likewise, the first storage unit may be a storage medium 125 as described with reference to FIG. 1 of the present disclosure, and may be internal or external to the apparatus 1600 which performs the method of the present embodiment.

Determining whether or not a record of the event exists in the first storage unit may comprise performing a lookup function using the information of the first event between the first party and the second party which has been received in the electronic message. Alternatively, the method may comprise searching the first storage unit for a unique identifier associated with the first event or, alternatively, querying the first storage unit regarding the presence of certain information regarding the first event. In fact, it will be appreciated that the method of determining whether or not a record of the event exists in the first storage unit is not particularly limited and any suitable method may be used as required.

In some examples, events which are "seen" by apparatus 1600 (that is, which occur fully within a management region or environment in which the apparatus 1600 is located) are automatically added to the first storage unit by the apparatus 1600. Alternatively, information regarding events which are "seen" by apparatus 1600 may be added to the first storage unit by external entities which monitor the events between the first and second parties. In some examples, this external entity may be the entity which sends the electronic message that is received by apparatus 1600 (that is, the external entity may be a requesting party).

In any event, the first storage unit stores a list of the events which have been "seen" by apparatus 1600 (that is, a list of all the events that apparatus 1600 is aware of and/or has processed).

In this embodiment, when it is determined that the record of the event does exist in the storage unit, the method proceeds to step, and ends with, step S1906. That is, when a record of the event which has been notified is determined to be present in the first storage unit, then it is known that the apparatus 1600 is aware of, or has processed, the event and thus no further action needs to be taken at this stage.

However, when it is determined that a record of the first event does not exist, the method according to the present embodiment proceeds to step S1908.

In step S1908, the method comprises determining, by the second circuitry, whether any subsequent events, between the second party and a third party, are initiated by the second party within a predetermined time of the first event.

In some examples, this may comprise determining whether any subsequent events have already occurred between the second party and a third party. In other examples, this may comprise monitoring the activities of the second party in order to determine whether the second party initiates any subsequent events within the predetermined time of the first event.

In some examples, the first and second event may be events of the same type. However, the present disclosure is not intended to be particularly limited in this regard. That is, the first event may be an event of a first type, while the second event may be of a second type which is different to the first type of event. Consider the example of a communication network. In this example situation, the first event may comprise an exchange of an electronic message (such as an email or text message) between the first party and the second party. In contrast, the second event may comprise an event such as a telephone call between the second party and the third party.

Alternatively, in the example of a financial situation, the first event may be a transaction conducted by a SWIFT payment, while the second event may be a transaction conducted by the FPS system.

Likewise, in some examples, the first and second event may occur within the same geographical region. Alternatively, the first event may occur in a first geographical region while the second event may occur in a second geographical region different to the first geographical region.

Furthermore, in some examples, the third party may be the same entity as the first party. That is, in the example of a transaction between two parties, the second party may send some, or all, of the funds back to the first party who initiated the original transaction.

Determining whether any of those subsequent events occur within a predetermined time of the first event enables the apparatus 1600 (or the entity performing the method of the present embodiment) to determine whether those subsequent events are likely to be connected to the original event which has been reported. That is, in many situations following an event of interest, it is desirable to monitor only those subsequent events which can be considered temporally related to the original event (i.e. the event of interest). Of course, the duration of the predetermined time itself is not particularly limited and will vary in accordance with the situation to which the present embodiment of the disclosure is applied.

In some examples, a dynamic predetermined time may be used, whereby the predetermined time is itself set in accordance with at least one content of the electronic message, a type of the first event and an attribute of the first event. The content of the electronic message may be an indication as to a level of certainty that the first event was an event of interest. For example, when the level of certainty that the first event is an event of interest is higher, the predetermined time during which a subsequent event must occur may be increased.

Likewise, the predetermined time may be increased depending on the type or nature of the first event. The predetermined time may be increased when the first event is a payment made via cheque for example. This is because certain types of events are known to be of higher interest than other types of event. Alternatively, even an attribute of the first event (being the event of interest) could be used in order to set the predetermined time in accordance with the present embodiment of the disclosure, since an event, such as a transaction of unusually high or low value, may also be of higher interest than other types of event.

When it is determined that no subsequent event is, or was, initiated by the second party within the predetermined time of the first event, the method proceeds to, and ends with, step S1910. That is, no subsequent events were deemed to be connected to the first event and thus there is no requirement to assemble, construct or store a set of connected events related to that original event at this stage.

However, when it is determined that a subsequent event initiated by the second party occurs within a predetermined time of the first event, the method proceeds to step S1912.

In step S1912, the method comprises storing, by the second circuitry, an association between the second party and a first set of events, the first set of events comprising the first event and the subsequent event, in a second storage unit, when the subsequent event is initiated within the predetermined time.

The second storage unit may be a storage medium such as storage medium 125 described with reference to FIG. 1 of the present disclosure, for example. Likewise, second storage unit may be internal, or external, to apparatus 1600 (that is, internal or external to the apparatus which performs the method according to the present embodiment of the disclosure).

In some examples, the second storage unit may be the same as, or share a part, of the first storage unit.

However, it will be appreciated that the first storage unit stores a record of all the events which have been "seen" by the apparatus 1600 (that is, those events which occur within the same network or region as the apparatus 1600, for example) while the second storage unit is used to store an association between a party and the event, or set of events, with which that party is associated. In this manner, the second storage unit may be used in order to trace the connections between parties and/or the dispersion of funds, messages or commodities through the network.

That is, when a subsequent event is initiated by the second party within a predetermined time of the first party, an association between the second party and a set of events (comprising the first event (being the event between the first party and the second party) and the subsequent event (being the event initiated by the second party between the second party and the third party)) is stored in the storage unit. This association may be in the form of a dispersion tree, for example.

Alternatively, this association may be between a unique identifier of the second party and both a unique identifier of the first event and a unique identifier of the subsequent event.

Then, once the set of events has been stored, the method proceeds to, and ends with, step S1914.

According to the embodiment of the present disclosure, even when events occur between entities in different networks (that is, are initiated by an entity in a first network or region), the subsequent connections between entities, such as the dispersal of messages or funds through the network can be rapidly identified, in a substantially real time environment.

Additional Modifications:

It is envisaged that a number of modifications may be made to the method of the present embodiment described with reference to FIG. 19 of the present disclosure. These modifications comprise optional steps which may be included in the method according to the present embodiment of the disclosure which was described with reference to FIG. 19 of the present disclosure.

Figure 20:
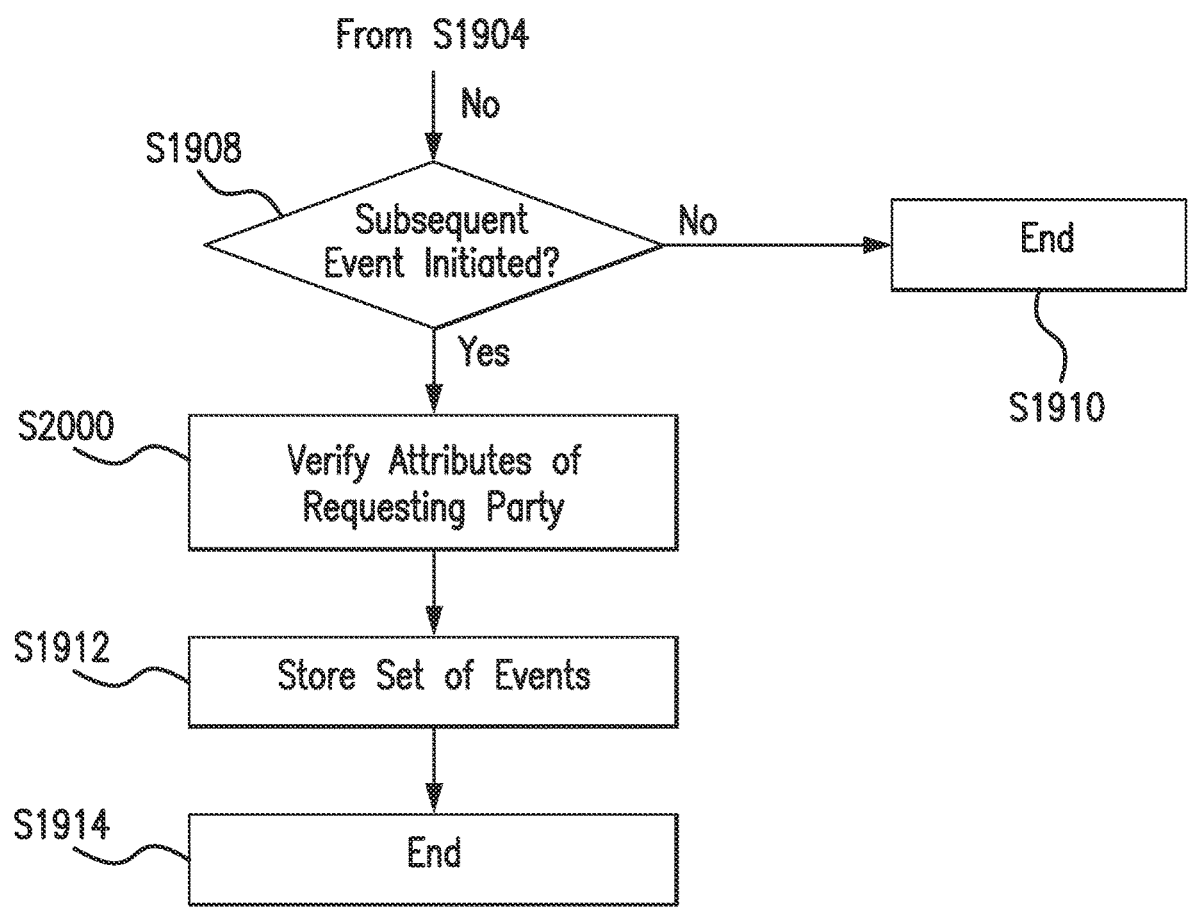
FIG. 20 illustrates a method of storing a set of events in accordance with examples of the disclosure.

FIG. 20 illustrates a method of storing a set of events in accordance with examples of the disclosure. That is, a first modification of the method described with reference to FIG. 19 of the present disclosure is described with reference to FIG. 20.

In this example modification, the method begins at step S1908 (that is, directly after step S1904 of the method as described with reference to FIG. 19 of the present disclosure). It will be appreciated that steps S1908, S1910, S1912 and S1914 are substantially the same as the correspondingly numbered steps described with reference to FIG. 19 of the present disclosure. Accordingly, for brevity of description, a further discussion of these steps will not be provided.

Nevertheless, it will be appreciated that when a subsequent event is determined to have been initiated by the second party within a predetermined time of the first event (between the first party and the second party) the method according to this example modification proceeds to step S2000.

In step S2000, the method comprises verifying, by the second circuitry, on or more attributes of the requesting party (being the party from which the electronic message was received in step S1902) prior to the storage of the association between the second party and the first set of events.

The one or more attributes of the requesting party may be indicated in the electronic message which is received by the apparatus 1600 in step S1902. For example, the electronic message may comprise information regarding the identity of the requesting party. Then, in step S2000, the method comprises verifying these attributes (such as the identity of the requesting party) prior to the storage of the set of events in the second storage unit (which is performed in step S1912).

The attributes of the requesting party may be verified in any suitable manner, depending on the situation, as required. For example, when at least one of the one or more attributes which must be verified is the identity of the requesting party, the method may comprise the use of digital tokens, public key cryptography and/or digital signatures in order to authenticate the identity of the requesting party.

It will be appreciated that the one or more attributes of the requesting party are not particularly limited to the identity of the requesting party. For example, these attributes could also comprise an indication of the reliability of the requesting party (based on previous requests which have been made) permissions of that requesting party to trace the events the second party engages in, or the like. Likewise, verification may comprise a comparison of the identity of the requesting party (once authenticated) against a known list of permissions associated with that party (stored in a storage unit such as storage medium 125 as described with reference to FIG. 1 of the present disclosure).

If the one or more attributes of the requesting party cannot be verified, the method may comprise asking the requesting party to provide further verification information. Alternatively, or if the requesting party fails to provide such further verification information when asked, the method may proceed directly to, and end with, step S1914 (without storage of the set of events in S1912).

Verification of the one or more attributes of the requesting party in this manner thus improves the security of the system (by preventing unauthorised or unverified parties from engaging in monitoring the activities of the second party and/or dispersion of messages or funds through the network).

However, once the one or more attributes of the requesting party have been verified, the method proceeds to step S1912. It will be appreciated that, as noted above, steps S1912 and S1914 are substantially the same as the correspondingly numbered steps described with reference to FIG.

19 of the present disclosure. Accordingly, for brevity of description, a repetition of the details of these steps will not be provided at this stage.

Figure 21:
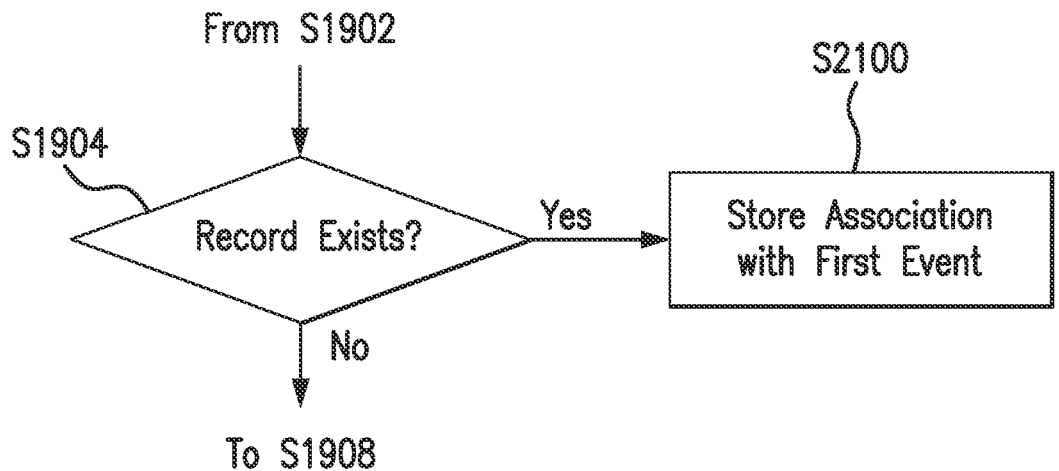
FIG. 21 illustrates a method of storing a set of events in accordance with examples of the disclosure.

FIG. 21 illustrates a method of storing a set of events in accordance with examples of the disclosure. That is, a second modification of the method described with reference to FIG. 19 of the present disclosure is described with reference to FIG. 21.

In this example modification, the method begins at step S1904 (following directly from step S1902 as described with reference to FIG. 19 of the present disclosure). The process performed by apparatus 1600 when it is determined that the record of the first event does not exist (in step S1904) is substantially the same as that described with reference to FIG. 19 of the present disclosure.

However, when, in step S1904, it is determined that the record of the first event does exist, the method comprises storing, by the second circuitry, an association between the second party and the first event in the second storage unit. In this manner, even when it is determined that the payment exists in the first storage unit (that is, the payment relates to a payment which has occurred fully within the network or system in which the apparatus 1600 is located) an association between the beneficiary and the transaction is generated. In the case of a transaction, for example, it is then possible to rapidly and efficiently trace the dispersion of funds through the network using this association and the method as described with reference to FIG. 13 of the present disclosure, for example.

Figure 22:
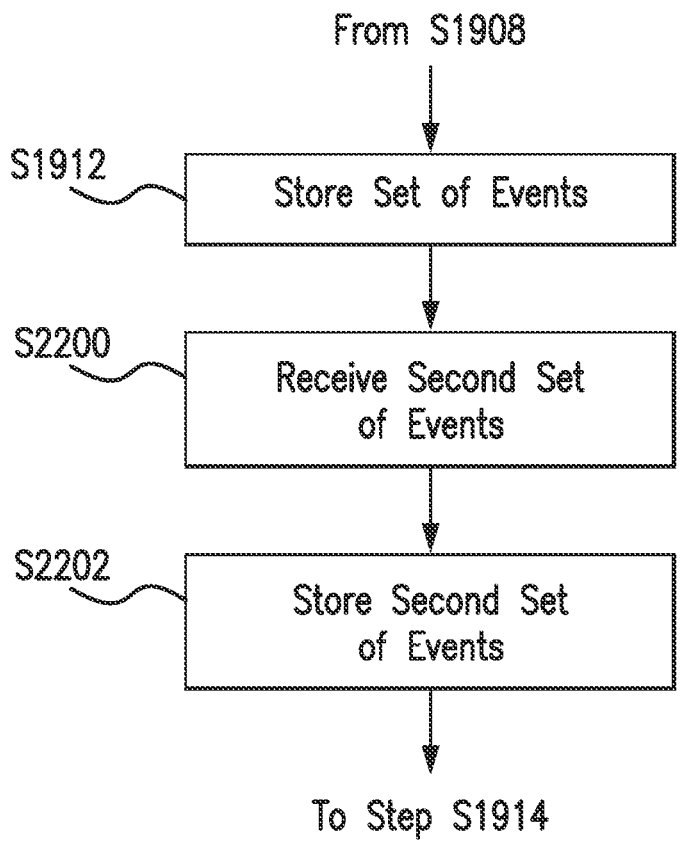
FIG. 22 illustrates a method of storing a set of events in accordance with examples of the disclosure.

FIG. 22 illustrates a method of storing events in accordance with examples of the disclosure. That is, a third modification of the method described with reference to FIG. 19 is described with reference to FIG. 22 of the present disclosure.

In this example modification, the method beings at step S1912 (following directly from step S1908 as described with reference to FIG. 19 of the present disclosure. It will be appreciated that step S1912 is substantially the same as the correspondingly numbered step as described with reference to FIG. 19 of the present disclosure, so a detailed discussion of this step will not be provided at this stage for the brevity of description.

However, once the first set of events (comprising the first events between the first party and the second party, and the subsequent event between the second party and the third party) has been stored in association with the second party, the method according to the present example modification proceeds to step S2200.

In step S2200, the method comprises receiving, by the first circuitry, a second set of events associated with the first party from an entity within the first geographical region. The first circuitry may be network connection circuitry such as a network connection 115 as described with reference to FIG. 1 of the present disclosure. The entity in the first geographical region may be an apparatus such as apparatus 1600 which has built a set of events (the second set of events) which the first entity is associated with in the first geographical region.

The method, according to this example modification, then proceeds to step S2202.

In step S2202, the method comprises storing, by the second circuitry, the second set of events in association with the first set of events, in the second storage unit. That is, the second circuitry (which may be a processor circuitry 110 as described with reference to FIG. 1 of the present disclosure) may store the second set of events (relating to the first geographical region) in association with the first set of events and the second party (in the second geographical region).

Consider the example situation described with reference to FIG. 16 of the present disclosure. In this example situation, apparatus 1600 is located in the second network and thus builds a set of events relating to the dispersion of funds from account 1608 in accordance with the present embodiment of the disclosure. This dispersion of funds (an example of a set of events) is also illustrated with reference to FIGS. 18A and 18B of the present disclosure. However, apparatus 1600 in FIG. 16 itself is not able to build a set of events relating to the dispersion or transfer of funds in the first network (in which the account 1608 is located).

Accordingly, in this example modification of the present disclosure, the apparatus 1600 may receive a set of events relating to the dispersion or transfer of funds in the first network, and then store this set of events in association with the set of events which have been constructed in the second geographical region. Connecting the sets of events in this manner enables a uniform picture of the transfer and dispersion of funds (constructed in the individual first and second networks) to be obtained when a transfer of funds has occurred across network boundaries. This provides a wider view of events, such as the exchange of messages or the transfer of funds, across different networks.

The method then proceeds to, and ends with, step S1914.

It will be appreciated that while the optional modifications of the method of the present embodiment have been described separately, they may, alternatively, be applied in combination if required.

Numerous modifications and variations of the present disclosure are possible in light of the above teachings. It is therefore to be understood that within the scope of the appended claims, the disclosure may be practiced otherwise than as specifically described herein.

In so far as examples of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described examples with reference to different functional units, circuitry and/or processors. However, it will be apparent that any suitable distribution of functionality between different functional units, circuitry and/or processors may be used without detracting from the examples.

Described examples may be implemented in any suitable form including hardware, software, firmware or any combination of these. Described examples may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed examples may be implemented in a single unit or may be physically and functionally distributed between different units, circuitry and/or processors.

Although the present disclosure has been described in connection with some examples, it is not intended to be limited to the specific form set forth herein. Additionally, although a feature may appear to be described in connection with particular examples, one skilled in the art would recognize that various features of the described examples may be combined in any manner suitable to implement the technique.

The invention claimed is:

1. A method of tracing events, the method comprising:
receiving, by a processor of a computer device of a destination payment network, an electronic message from a sending payment network, the electronic message comprising information of a first event between a first party having a first account associated with the sending payment network and a second party having a second account associated with the destination payment network and a notification from the sending payment network that the first account is associated with a potentially fraudulent transaction and that the sending payment network has initiated a first trace of the first account within the sending payment network, the first event being initiated by the first party,
the sending payment network having an incompatibility with the destination payment network that prevents the sending payment network from continuing the first trace within the destination payment network, and
wherein the electronic message includes information relating to an electronic transaction comprising one of a FPS transaction, a BACS transaction, a SWIFT transaction or a CHAPS transaction;
initiating, by the processor of the computer device, a second trace of the second account within the destination payment network responsive to the notification from the sending payment network;
based on the initiated second trace, within the destination payment network:
determining, by the processor of the computer device, that a record of the first event does not exist in a first storage unit;
responsive to determining that the record of the first event does not exist, determining, by the processor of the computer device, whether any subsequent events between the second party and a third party are initiated by the second party within a predetermined time of the first event; and
storing, by the processor of the computer device, an association between the second party and a first set of events, the first set of events comprising the first event and a subsequent event, in a second storage unit, when the subsequent event is initiated within the predetermined time, wherein the stored association represents a portion of a dispersion tree that tracks traced events across the sending payment network and the destination payment network,
wherein the portion of the dispersion tree stored in the second storage unit at the destination payment network is linked to at least the first event from the sending payment network and subsequent events associated with the first event at the destination payment network so that traced events from the sending payment network are associated with traced events at the destination payment network to identify traced events across the sending payment network and the destination payment network.

2. The method of claim 1, wherein the electronic message comprises information of an exchange between the first party and the second party.

3. The method according to claim 2, wherein the exchange between the first party and a second party is an electronic transaction.

4. The method of claim 1, wherein the electronic message is a notification identifying the first event as an event of interest.

5. The method according to claim 4, wherein the event of interest is one of a fraudulent event or a potentially fraudulent event.

6. The method of claim 1, wherein the electronic message is received from a requesting party and the method comprises:
verifying, by the processor, one or more attributes of the requesting party prior to the storage of the association between the second party and the first set of events.

7. The method of claim 1, wherein when it is determined that the record of the first event does exist, the method comprises storing, by the processor, an association between the second party and the first event in a storage unit.

8. The method of claim 1, further comprising:
determining, by the processor, whether any further subsequent events are initiated by the second party and/or the third party within a predetermined time of the subsequent event; and
adding, by the processor, the further subsequent event to the first set of events when the further subsequent event is initiated within the predetermined time.

9. The method of claim 1, wherein the predetermined time is set, by the processor, in accordance with the at least one of: a content of the electronic message, a type of the first event and an attribute of the first event.

10. The method of claim 1, wherein the first event is of a first type and the second event is of a second type different to the first type.

11. The method of claim 1, wherein the first event occurs within a first geographical region and the second event occurs within a second geographical region different than the first geographical region.

12. The method of claim 11, further comprising:
receiving, by the processor, a second set of events associated with the second party from an entity within the first geographical region; and
storing, by the processor, the second set of events, in association with the first set of events, in the second storage unit.

13. An apparatus for storing a set of events, the apparatus comprising a processor of a destination payment network programmed to:
receive an electronic message from a sending payment network, the electronic message comprising information of a first event between a first party having a first account associated with the sending payment network and a second party having a second account associated with the destination payment network and a notification from the sending payment network that the first account is associated with a potentially fraudulent transaction and that the sending payment network has initiated a first trace of the first account within the sending payment network, the first event being initiated by the first party,
the sending payment network having an incompatibility with the destination payment network that prevents the sending payment network from continuing the first trace within the destination payment network, and
wherein the electronic message includes information relating to an electronic transaction comprising one of a FPS transaction, a BACS transaction, a SWIFT transaction or a CHAPS transaction;

initiate a second trace of the second account within the destination payment network responsive to the notification from the sending payment network;

based on the initiated second trace, within the destination payment network:
  determine whether a record of the first event exists in a first storage unit;
  wherein processor is programmed to, when it is determined that the record of the first event does not exist:
    determine whether any subsequent events between the second party and a third party are initiated by the second party within a predetermined time of the first event; and
    store an association between the second party and a first set of events, the first set of events comprising the first event and a subsequent event, in a second storage unit, when the subsequent event is initiated within the predetermined time, wherein the stored association represents a portion of a dispersion tree that tracks traced events across the sending payment network and the destination payment network,
  wherein the portion of the dispersion tree stored in the second storage unit at the destination payment network is linked to at least the first event from the sending payment network and subsequent events associated with the first event at the destination payment network so that traced events from the sending payment network are associated with traced events at the destination payment network to identify traced events across the sending payment network and the destination payment network.

14. The apparatus of claim 13, wherein the electronic message comprises information of an exchange between the first party and the second party.

15. The apparatus of claim 14, wherein the exchange between the first party and a second party is an electronic transaction.

16. The apparatus of claim 13, wherein the electronic message is received from a requesting party and wherein the processor is further programmed to:
  verify one or more attributes of the requesting party prior to the storage of the association between the second party and the first set of events.

17. The apparatus of claim 13, wherein the processor is further programmed to:
  determine whether any further subsequent events are initiated by the second party and/or the third party within a predetermined time of the subsequent event; and
  add the further subsequent event to the first set of events when the further subsequent event is initiated within the predetermined time.

18. A non-transitory computer-readable medium storing instructions that, when executed by a computer of a destination payment network, cause the computer to:

receive an electronic message from a sending payment network, the electronic message comprising information of a first event between a first party having a first account associated with the sending payment network and a second party having a second account associated with the destination payment network and a notification from the sending payment network that the first account is associated with a potentially fraudulent transaction and that the sending payment network has initiated a first trace of the first account within the sending payment network, the first event being initiated by the first party, the sending payment network having an incompatibility with the destination payment network that prevents the sending payment network from continuing the first trace within the destination payment network, and wherein the electronic message includes information relating to an electronic transaction comprising one of a FPS transaction, a BACS transaction, a SWIFT transaction or a CHAPS transaction;

initiate a second trace of the second account within the destination payment network responsive to the notification from the sending payment network;

based on the initiated second trace, within the destination payment network:
  determine whether a record of the first event exists in a first storage unit;
  wherein the computer is caused to, when it is determined that the record of the first event does not exist:
    determine whether any subsequent events between the second party and a third party are initiated by the second party within a predetermined time of the first event; and
    store an association between the second party and a first set of events, the first set of events comprising the first event and a subsequent event, in a second storage unit, when the subsequent event is initiated within the predetermined time, wherein the stored association represents a portion of a dispersion tree that tracks traced events across the sending payment network and the destination payment network,
  wherein the portion of the dispersion tree stored in the second storage unit at the destination payment network is linked to at least the first event from the sending payment network and subsequent events associated with the first event at the destination payment network so that traced events from the sending payment network are associated with traced events at the destination payment network to identify traced events across the sending payment network and the destination payment network.

* * * * *